United States Patent [19]

Maclay, Sr. et al.

[11] Patent Number: 5,059,125
[45] Date of Patent: Oct. 22, 1991

[54] BOWLING TUTOR

[75] Inventors: William R. Maclay, Sr., Los Gatos; Franklin G. Fisher, San Jose, both of Calif.

[73] Assignee: Better Bowling, Inc., San Jose, Calif.

[21] Appl. No.: 393,290

[22] Filed: Aug. 14, 1989

[51] Int. Cl.⁵ ............................................. A63D 5/00
[52] U.S. Cl. ................................... 434/249; 273/37
[58] Field of Search ................. 434/249, 247, 339; 273/54 D, 54 C, 37; 340/323 R, 323 B

[56] References Cited

U.S. PATENT DOCUMENTS

| | | | |
|---|---|---|---|
| 2,942,358 | 6/1960 | Pomranz | 434/249 |
| 2,989,810 | 6/1961 | Marting | 434/249 |
| 3,012,339 | 12/1961 | Peterson | 434/249 |
| 3,081,559 | 3/1963 | Kaminsky | 434/249 |
| 3,120,956 | 2/1964 | Burgess | 273/543 C |
| 3,212,779 | 10/1965 | Gruss | 273/543 C |
| 3,223,416 | 12/1965 | Blewitt | 273/543 C |
| 3,250,535 | 5/1966 | Patterson | 273/543 C |
| 3,252,705 | 5/1966 | Cornberg | 340/323 B |
| 3,269,731 | 8/1966 | Koci et al. | 40/442 X |
| 3,279,097 | 10/1966 | Tombilin | 434/249 |
| 3,374,557 | 3/1968 | Loturius | 434/249 |
| 3,455,032 | 7/1969 | Vail | 434/249 |
| 3,460,882 | 8/1969 | Blewitt | 273/543 C |
| 3,841,633 | 10/1974 | Walsh | 273/543 C |
| 4,302,010 | 11/1981 | Kaenel | 273/54 D |
| 4,339,128 | 7/1982 | Multen | 273/543 C |
| 4,369,971 | 1/1983 | Chang et al. | 273/37 X |
| 4,415,327 | 11/1983 | Green | 434/249 |
| 4,607,843 | 8/1986 | Signoretti | 273/543 C |
| 4,776,801 | 10/1980 | Summers | 434/249 |
| 4,824,109 | 4/1989 | Cervantes | 340/323 B X |
| 4,937,772 | 6/1990 | Chavez et al. | 434/249 X |

OTHER PUBLICATIONS

*Popular Science*; "What's New"; Jul. 1988, p. 70.

*Primary Examiner*—Richard J. Apley
*Assistant Examiner*—Rachel M. Healey

[57] ABSTRACT

A pocket sized, hand held electronic device for indicating the ball path for both the strike and spare ball. To indicate where the ball should start from the foul line, over which arrow it should pass and where it should strike the pin array. A plurality of indicators are provided at appropriate locations on the part of the device on which the static image of a standard bowling alley is provided. By pressing switch elements of a membrane switch arranged in the same configuration as the pattern of the real bowling pins, the user indicates which pins are still standing for the second ball, for a spare. With this input the device indicates the recommended ball path. Pressing a reset switch returns the display to the strike setting, to again indicate the ball path for the first ball of the next frame. The device can be adjusted to match the actual curve of the ball. One embodiment provides limited directions while a second embodiment provides more directions for the advanced bowler.

15 Claims, 32 Drawing Sheets

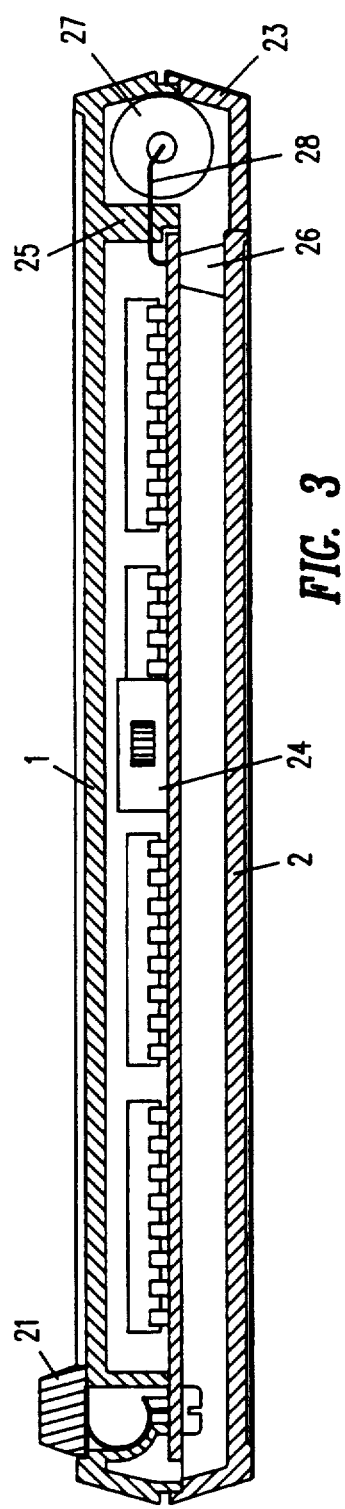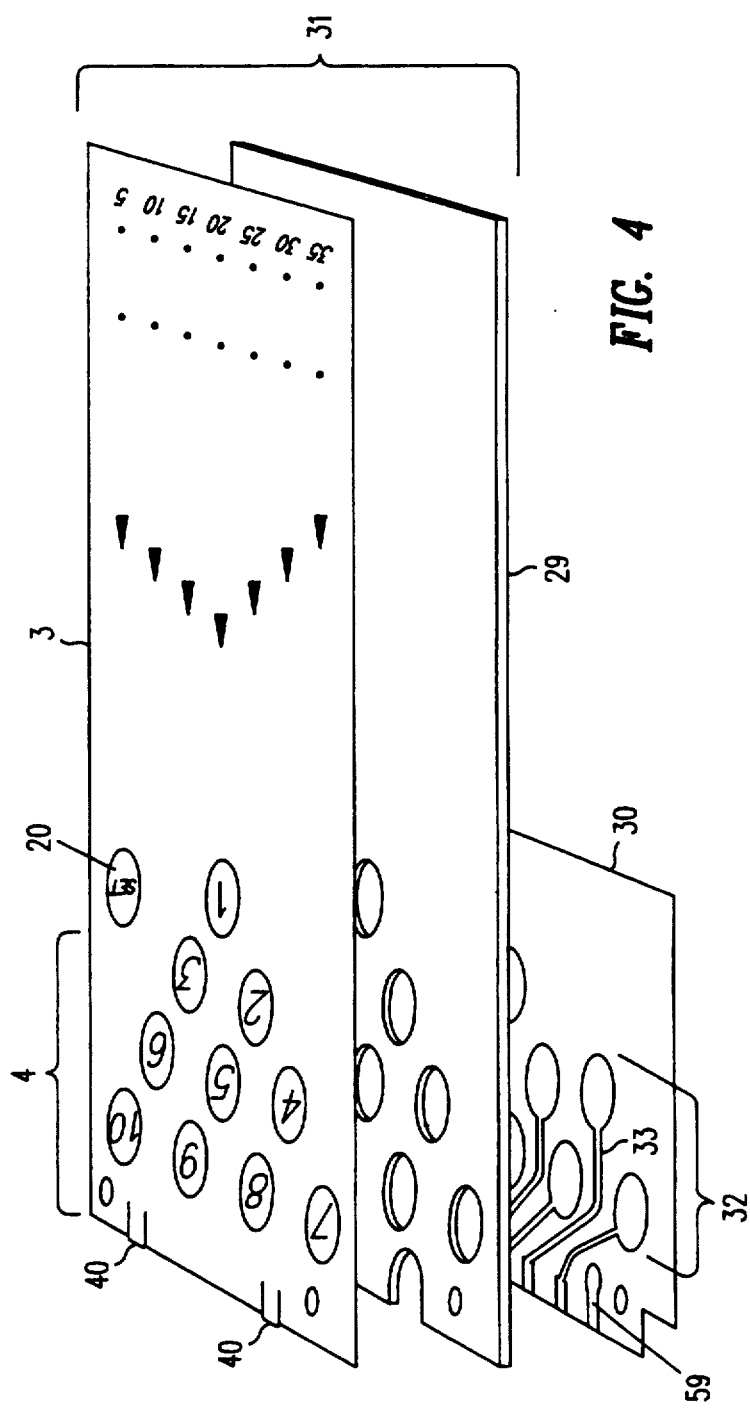

TRUTH TABLE

| PINS STAND-ING | RIGHT HAND | | | | LEFT HAND | | | |
|---|---|---|---|---|---|---|---|---|
| | Target pin | Arrow Mini | Arrow Maxi | Foul Line | Target Pin | Arrow Mini | Arrow Maxi | Foul Line |
| Strike | P5 | A12.5 | A10 | F15 | P5 | A27.5 | A30 | F25 |
| 1 | P5 | A15 | A12.5 | F15 | P5 | A25 | A27.5 | F25 |
| 2 | P2/4 | A15 | A12.5 | F17 | P2/4 | A25 | A27.5 | F23 |
| 3 | P9/10 | A12.5 | A10 | F25 | P9/10 | A27.5 | A30 | F15 |
| 4 | P2/4 | A12.5 | A10 | F09 | P2/4 | A27.5 | A30 | F31 |
| 5 | P5 | A12.5 | A10 | F15 | P5 | A27.5 | A30 | F25 |
| 6 | P9/10 | A12.5 | A10 | F25 | P9/10 | A27.5 | A30 | F15 |
| 7 | P7/8 | A15 | A12.5 | F09 | P7/8 | A25 | A27.5 | F31 |
| 8 | P7/8 | A12.5 | A10 | F09 | P7/8 | A27.5 | A30 | F31 |
| 9 | P9/10 | A15 | A12.5 | F25 | P9/10 | A25 | A27.5 | F15 |
| 10 | P9/10 | A12.5 | A10 | F25 | P9/10 | A27.5 | A30 | F15 |
| 1-2 | P2/4 | A15 | A12.5 | F17 | P2/4 | A25 | A27.5 | F23 |
| 1-4 | P2/4 | A15 | A12.5 | F17 | P2/4 | A12.5 | A27.5 | F23 |
| 1-7 | P2/4 | A15 | A12.5 | F17 | P2/4 | A25 | A27.5 | F23 |
| 2-3 | P5 | A15 | A12.5 | F17 | P5 | A25 | A27.5 | F23 |
| 2-4 | P2/4 | A15 | A12.5 | F17 | P2/4 | A25 | A27.5 | F23 |
| 2-5 | P5 | A15 | A12.5 | F15 | P5 | A25 | A27.5 | F25 |
| 2-8 | P5 | A15 | A12.5 | F15 | P5 | A25 | A27.5 | F25 |
| 5-8 | P5 | A12.5 | A10 | F15 | P5 | A27.5 | A30 | F25 |
| 5-9 | P5 | A12.5 | A10 | F15 | P5 | A27.5 | A30 | F25 |
| 3-6 | P3/6 | A15 | A12.5 | F25 | P3/6 | A25 | A27.5 | F15 |
| 3-9 | P3/6 | A15 | A12.5 | F25 | P3/6 | A25 | A27.5 | F15 |
| 4-7 | P7/8 | A15 | A12.5 | F17 | P7/8 | A25 | A27.5 | F23 |
| 4-8 | P7/8 | A15 | A12.5 | F17 | P7/8 | A25 | A27.5 | F23 |
| 6-4 | P7/8 | A12.5 | A10 | F25 | P7/8 | A27.5 | A30 | F15 |
| 6-10 | P7/8 | A12.5 | A10 | F25 | P7/8 | A27.5 | A30 | F15 |
| 7-8 | P7/8 | A15 | A12.5 | F09 | P7/8 | A25 | A27.5 | F31 |
| 9-10 | P9/10 | A15 | A12.5 | F25 | P9/10 | A25 | A27.5 | F15 |
| 4-6 | P2/4 | A15 | A12.5 | F09 | P2/4 | A25 | A27.5 | F31 |
| 4-9 | P2/4 | A15 | A12.5 | F09 | P2/4 | A25 | A27.5 | F31 |
| 4-10 | P2/4 | A15 | A12.5 | F09 | P2/4 | A25 | A27.5 | F31 |
| 7-9 | P7/8 | A15 | A12.5 | F09 | P7/8 | A25 | A27.5 | F31 |
| 7-10 | P7/8 | A15 | A12.5 | F09 | P7/8 | A25 | A27.5 | F31 |
| 8-10 | P7/8 | A15 | A12.5 | F09 | P7/8 | A25 | A27.5 | F31 |

FIG. 9

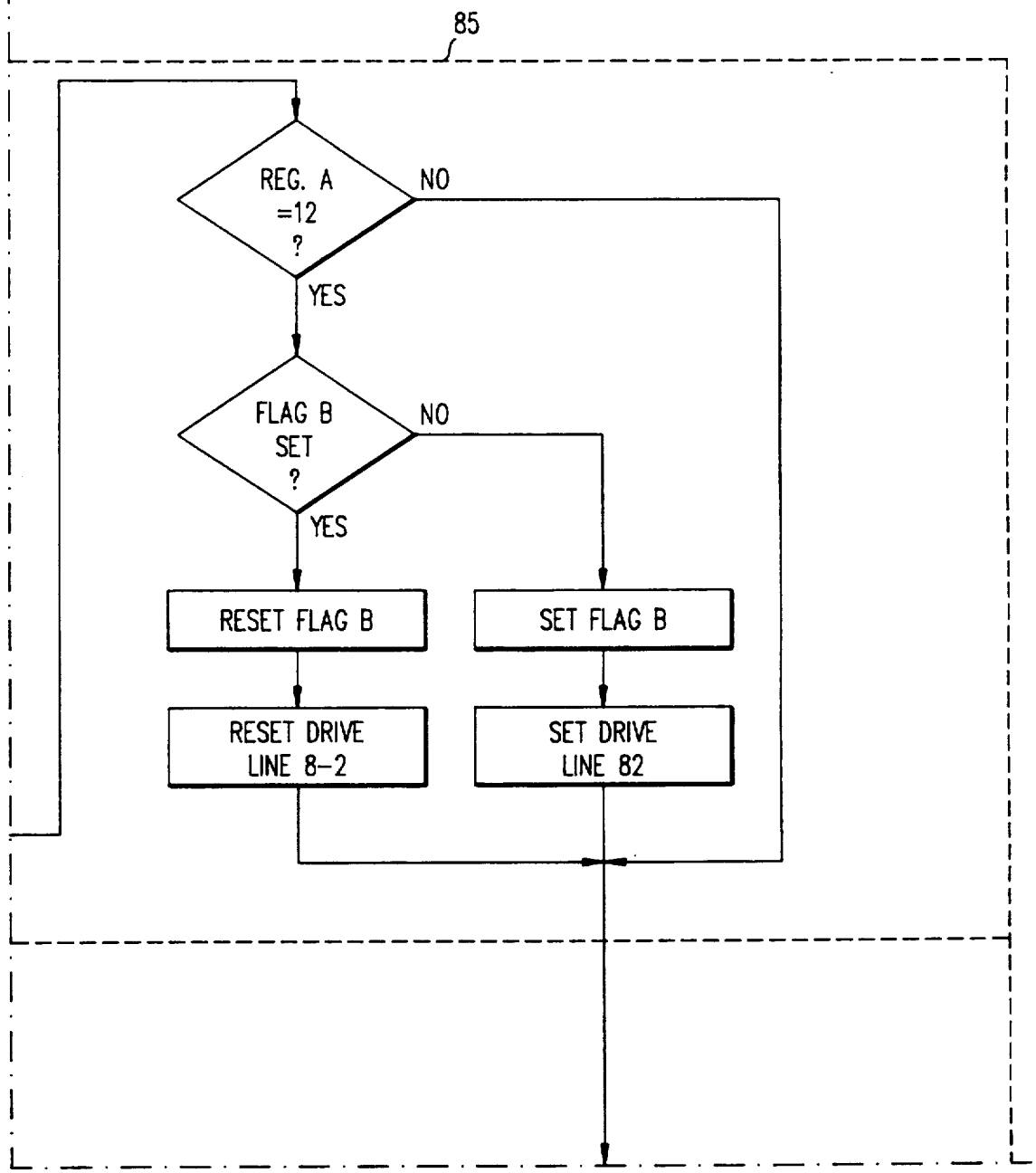
FIG. 12"

| PINS STANDING CONFIGURATION | HOOK DEGREE | FOUL LINE No. | ARROW No. | TARGET CIRCLE |
|---|---|---|---|---|
| STRIKE | MX | 17 | 08 | 5 |
| STRIKE | AV | 17 | 10 | 5 |
| STRIKE | MN | 17 | 12 | 5 |
| STRIKE | FL | 15 | 10 | 5 |
| 1-2-3-4-5-6-7-8-9 | MX | 17 | 08 | 5 |
| 1-2-3-4-5-6-7-8-9 | AV | 17 | 10 | 5 |
| 1-2-3-4-5-6-7-8-9 | MN | 17 | 12 | 5 |
| 1-2-3-4-5-6-7-8-9 | FL | 15 | 10 | 5 |
| 1-2-3-4-5-6-8-9-10 | MX | 17 | 08 | 5 |
| 1-2-3-4-5-6-8-9-10 | AV | 17 | 10 | 5 |
| 1-2-3-4-5-6-8-9-10 | MN | 17 | 12 | 5 |
| 1-2-3-4-5-6-8-9-10 | FL | 15 | 10 | 5 |
| 1-2-3-4-5-6-8-9 | MX | 17 | 08 | 5 |
| 1-2-3-4-5-6-8-9 | AV | 17 | 10 | 5 |
| 1-2-3-4-5-6-8-9 | MN | 17 | 12 | 5 |
| 1-2-3-4-5-6-8-9 | FL | 15 | 10 | 5 |
| 1-2-3-4-5-6-7-8 | MX | 17 | 08 | 5 |
| 1-2-3-4-5-6-7-8 | AV | 17 | 10 | 5 |
| 1-2-3-4-5-6-7-8 | MN | 17 | 12 | 5 |
| 1-2-3-4-5-6-7-8 | FL | 15 | 10 | 5 |
| 1-2-3-4-5-6-7 | MX | 17 | 08 | 5 |
| 1-2-3-4-5-6-7 | AV | 17 | 10 | 5 |
| 1-2-3-4-5-6-7 | MN | 17 | 12 | 5 |
| 1-2-3-4-5-6-7 | FL | 15 | 10 | 5 |
| 1-2-3-4-5-6 | MX | 17 | 08 | 5 |
| 1-2-3-4-5-6 | AV | 17 | 10 | 5 |
| 1-2-3-4-5-6 | MN | 17 | 12 | 5 |
| 1-2-3-4-5-6 | FL | 15 | 10 | 5 |
| 1-2-3-4-5 | MX | 17 | 08 | 5 |
| 1-2-3-4-5 | AV | 17 | 10 | 5 |
| 1-2-3-4-5 | MN | 17 | 12 | 5 |
| 1-2-3-4-5 | FL | 15 | 10 | 5 |
| 1-5-7-8-9 | MX | 17 | 08 | 5 |
| 1-5-7-8-9 | AV | 17 | 10 | 5 |
| 1-5-7-8-9 | MN | 17 | 12 | 5 |
| 1-5-7-8-9 | FL | 15 | 10 | 5 |
| 1-5-7-8 | MX | 17 | 08 | 5 |
| 1-5-7-8 | AV | 17 | 10 | 5 |
| 1-5-7-8 | MN | 17 | 12 | 5 |
| 1-5-7-8 | fL | 15 | 10 | 5 |
| 1-5-7 | MX | 17 | 08 | 5 |
| 1-5-7 | AV | 17 | 10 | 5 |
| 1-5-7 | MN | 17 | 12 | 5 |
| 1-5-7 | FL | 15 | 10 | 5 |
| 1-5 | MX | 17 | 08 | 5 |
| 1-5 | AV | 17 | 10 | 5 |
| 1-5 | MN | 17 | 12 | 5 |
| 1-5 | FL | 15 | 10 | 5 |
| 1-2-3-5 | MX | 17 | 08 | 5 |
| 1-2-3-5 | AV | 17 | 10 | 5 |
| 1-2-3-5 | MN | 17 | 12 | 5 |
| 1-2-3-5 | FL | 15 | 10 | 5 |

FIG. 16a

| PINS STANDING CONFIGURATION | HOOK DEGREE | FOUL LINE No. | ARROW No. | TARGET CIRCLE |
|---|---|---|---|---|
| 1-2-3-4 | MX | 17 | 08 | 5 |
| 1-2-3-4 | AV | 17 | 10 | 5 |
| 1-2-3-4 | MN | 17 | 12 | 5 |
| 1-2-3-4 | FL | 15 | 10 | 5 |
| 1-2-3- | MX | 17 | 08 | 5 |
| 1-2-3- | AV | 17 | 10 | 5 |
| 1-2-3- | MN | 17 | 12 | 5 |
| 1-2-3- | FL | 15 | 10 | 5 |
| 1-3 | MX | 17 | 08 | 5 |
| 1-3 | AV | 17 | 10 | 5 |
| 1-3 | MN | 17 | 12 | 5 |
| 1-3 | FL | 15 | 10 | 5 |
| 1 | MX | 17 | 08 | 5 |
| 1 | AV | 17 | 10 | 5 |
| 1 | MN | 17 | 12 | 5 |
| 1 | FL | 15 | 10 | 5 |
| 1-2 | MX | 15 | 08 | 5 |
| 1-2 | AV | 15 | 10 | 5 |
| 1-2 | MN | 15 | 12 | 5 |
| 1-2 | FL | 15 | 14 | 5 |
| 1-2-4 | MX | 15 | 08 | 4 |
| 1-2-4 | AV | 15 | 10 | 4 |
| 1-2-4 | MN | 15 | 12 | 4 |
| 1-2-4 | FL | 15 | 14 | 4 |
| 2 | MX | 15 | 08 | 4 |
| 2 | AV | 15 | 10 | 4 |
| 2 | MN | 15 | 12 | 4 |
| 2 | FL | 15 | 14 | 4 |
| 2-4 | MX | 15 | 08 | 4 |
| 2-4 | AV | 15 | 10 | 4 |
| 2-4 | MN | 15 | 12 | 4 |
| 2-4 | FL | 15 | 14 | 4 |
| 2-4-5 | MX | 15 | 08 | 5 |
| 2-4-5 | AV | 15 | 10 | 5 |
| 2-4-5 | MN | 15 | 12 | 5 |
| 2-4-5 | FL | 15 | 14 | 5 |
| 2-4-8 | MX | 15 | 08 | 8 |
| 2-4-8 | AV | 15 | 10 | 8 |
| 2-4-8 | MN | 15 | 12 | 8 |
| 2-4-8 | FL | 15 | 14 | 8 |
| 3 | MX | 17 | 08 | 5 |
| 3 | AV | 17 | 10 | 5 |
| 3 | MN | 17 | 12 | 5 |
| 3 | FL | 17 | 14 | 5 |
| 4 | MX | 15 | 08 | 4 |
| 4 | AV | 15 | 10 | 4 |
| 4 | MN | 15 | 12 | 4 |
| 4 | FL | 15 | 14 | 4 |

FIG. 16b

| PINS STANDING CONFIGURATION | HOOK DEGREE | FOUL LINE No. | ARROW No. | TARGET CIRCLE |
|---|---|---|---|---|
| 2-4-7 | MX | 15 | 08 | 4 |
| 2-4-7 | AV | 15 | 10 | 4 |
| 2-4-7 | MN | 15 | 12 | 4 |
| 2-4-7 | FL | 15 | 14 | 4 |
| 1-3-6 | MX | 25 | 12 | 6 |
| 1-3-6 | AV | 25 | 14 | 6 |
| 1-3-6 | MN | 25 | 16 | 6 |
| 1-3-6 | FL | 25 | 18 | 6 |
| 3-6 | MX | 25 | 12 | 6 |
| 3-6 | AV | 25 | 14 | 6 |
| 3-6 | MN | 25 | 16 | 6 |
| 3-6 | FL | 25 | 18 | 6 |
| 3-6-9 | MX | 25 | 12 | 6 |
| 3-6-9 | AV | 25 | 14 | 6 |
| 3-6-9 | MN | 25 | 16 | 6 |
| 3-6-9 | FL | 25 | 18 | 6 |
| 3-6-10 | MX | 25 | 12 | 6 |
| 3-6-10 | AV | 25 | 14 | 6 |
| 3-6-10 | MN | 25 | 16 | 6 |
| 3-6-10 | FL | 25 | 18 | 6 |
| 7 | MX | 9 | 08 | 7 |
| 7 | AV | 9 | 10 | 7 |
| 7 | MN | 9 | 12 | 7 |
| 7 | FL | 9 | 14 | 7 |
| 7-8 | MX | 9 | 08 | 7 |
| 7-8 | AV | 9 | 10 | 7 |
| 7-8 | MN | 9 | 12 | 7 |
| 7-8 | FL | 9 | 14 | 7 |
| 4-7-8 | MX | 9 | 08 | 7/8 |
| 4-7-8 | AV | 9 | 10 | 7/8 |
| 4-7-8 | MN | 9 | 12 | 7/8 |
| 4-7-8 | FL | 9 | 14 | 7/8 |
| 4-7 | MX | 9 | 08 | 7 |
| 4-7 | AV | 9 | 10 | 7 |
| 4-7 | MN | 9 | 12 | 7 |
| 4-7 | FL | 9 | 14 | 7 |
| 9 | MX | 25 | 10 | 9 |
| 9 | AV | 25 | 12 | 9 |
| 9 | MN | 25 | 14 | 9 |
| 9 | FL | 25 | 16 | 9 |
| 10 | MX | 25 | 10 | 10 |
| 10 | AV | 25 | 12 | 10 |
| 10 | MN | 25 | 14 | 10 |
| 10 | FL | 25 | 16 | 10 |
| 6-9 | MX | 25 | 10 | 9 |
| 6-9 | AV | 25 | 12 | 9 |
| 6-9 | MN | 25 | 14 | 9 |
| 6-9 | FL | 25 | 16 | 9 |

FIG. 16c

| PINS STANDING CONFIGURATION | HOOK DEGREE | FOUL LINE No. | ARROW No. | TARGET CIRCLE |
|---|---|---|---|---|
| 6-9-10 | MX | 25 | 10 | 9\10 |
| 6-9-10 | AV | 25 | 12 | 9\10 |
| 6-9-10 | MN | 25 | 14 | 9\10 |
| 6-9-10 | FL | 25 | 16 | 9\10 |
| 6 | MX | 25 | 10 | 9 |
| 6 | AV | 25 | 12 | 9 |
| 6 | MN | 25 | 14 | 9 |
| 6 | FL | 25 | 16 | 9 |
| 5 | MX | 17 | 08 | 5 |
| 5 | AV | 17 | 10 | 5 |
| 5 | MN | 17 | 12 | 5 |
| 5 | FL | 17 | 14 | 5 |
| 8 | MX | 17 | 08 | 8 |
| 8 | AV | 17 | 10 | 8 |
| 8 | MN | 17 | 12 | 8 |
| 8 | FL | 17 | 14 | 8 |
| 8-9 | MX | 17 | 08 | 8/9 |
| 8-9 | AV | 17 | 10 | 8/9 |
| 8-9 | MN | 17 | 12 | 8/9 |
| 8-9 | FL | 17 | 14 | 8/9 |
| 5-8-9 | MX | 17 | 08 | 5 |
| 5-8-9 | AV | 17 | 10 | 5 |
| 5-8-9 | MN | 17 | 12 | 5 |
| 5-8-9 | FL | 17 | 14 | 5 |

FIG. 16d

TRUTH TABLE FOR
CONDENSED ADVANCED RIGH HAND MAXI HOOK BALL TRACKS

| PINS STANDING CONFIGURATION | BALL PATH EQUIVELANT | BALL TRACK POINTS | | | LISTED PATH |
|---|---|---|---|---|---|
| | | FOUL | ARROW | TARGET | |
| 1 | STRIKE | 17/15 | 8/10 | 5 | 1 |
| 1-2 | 1-2 | 15 | 8 | 5 | a |
| 1-2-3 | STRIKE | 17/15 | 8/10 | 5 | 1 |
| 1-2-3-4 | STRIKE | 17/15 | 8/10 | 5 | 1 |
| 1-2-3-4-5 | STRIKE | 17/15 | 8/10 | 5 | 1 |
| 1-2-3-4-5-6 | STRIKE | 17/15 | 8/10 | 5 | 1 |
| 1-2-3-4-5-6-7 | STRIKE | 17/15 | 8/10 | 5 | 1 |
| 1-2-3-4-5-6-7-8 | STRIKE | 17/15 | 8/10 | 5 | 1 |
| 1-2-3-4-5-6-7-8-9 | STRIKE | 17/15 | 8/10 | 5 | 1 |
| 1-2-3-4-5-6-7-8-9-10 | STRIKE | 17/15 | 8/10 | 5 | 1 |
| 1-2-3-5 | STRIKE | 17/15 | 8/10 | 5 | 1 |
| 1-2-4 | 2 | 15 | 8 | 4 | 2 |
| 1-3 | STRIKE | 17/15 | 8/10 | 5 | 1 |
| 1-3-6 | 3-6 | 25 | 12 | 6 | c |
| 1-5 | STRIKE | 17/15 | 8/10 | 5 | 1 |
| 1-5-7 | STRIKE | 17/15 | 8/10 | 5 | 1 |
| 1-5-7-8 | STRIKE | 17/15 | 8/10 | 5 | 1 |
| 1-5-7-8-9 | STRIKE | 17/15 | 8/10 | 5 | 1 |
| 2 | 2 | 15 | 8 | 4 | 2 |
| 2-3 | 5 | 17 | 8 | 5 | 5 |
| 2-3-4 | 5 | 17 | 8 | 5 | 5 |
| 2-3-5 | 5 | 17 | 8 | 5 | 5 |
| 2-4 | 2 | 15 | 8 | 4 | 2 |
| 2-4-5 | 1-2 | 15 | 8 | 5 | a |
| 2-4-7 | 2 | 15 | 8 | 4 | 2 |
| 2-4-8 | 2-4-8 | 15 | 8 | 8 | d |
| 2-8 | 8 | 17 | 8 | 8 | 8 |
| 3 | 5 | 17 | 8 | 5 | 5 |
| 3-6 | 3-6 | 25 | 12 | 6 | c |
| 3-6-9 | 3-6 | 25 | 12 | 6 | c |
| 3-6-10 | 3-6 | 25 | 12 | 6 | c |
| 4 | 2 | 15 | 8 | 4 | 2 |
| 4-5 | 8 | 17 | 8 | 8 | 8 |
| 4-5-6 | 8 | 17 | 8 | 8 | 8 |
| 4-7 | 7 | 9 | 8 | 7 | 7 |
| 4-7-8 | 7-8 | 9 | 8 | 7/8 | e |
| 5 | 5 | 17 | 8 | 5 | 5 |
| 5-6 | 6 | 25 | 10 | 9 | 6 |
| 5-8 | 5 | 17 | 8 | 5 | 5 |
| 5-8-9 | 5 | 17 | 8 | 5 | 5 |
| 5-9 | 6 | 25 | 10 | 9 | 6 |
| 6 | 6 | 25 | 10 | 9 | 6 |
| 6-9 | 6 | 25 | 10 | 9 | 6 |
| 6-9-10 | 6-9-10 | 25 | 10 | 9/10 | b |
| 6-10 | 3-6 | 25 | 12 | 6 | c |
| 7 | 7 | 9 | 8 | 7 | 7 |
| 7-8 | 7-8 | 9 | 8 | 7/8 | e |
| 8 | 8 | 17 | 8 | 8 | 8 |
| 8-9 | 8-9 | 17 | 8 | 8/9 | f |
| 9 | 6 | 25 | 10 | 9 | 6 |
| 9-10 | 3-6 | 25 | 12 | 6 | c |
| 10 | 10 | 25 | 8 | 10 | 10 |

FIG. 17

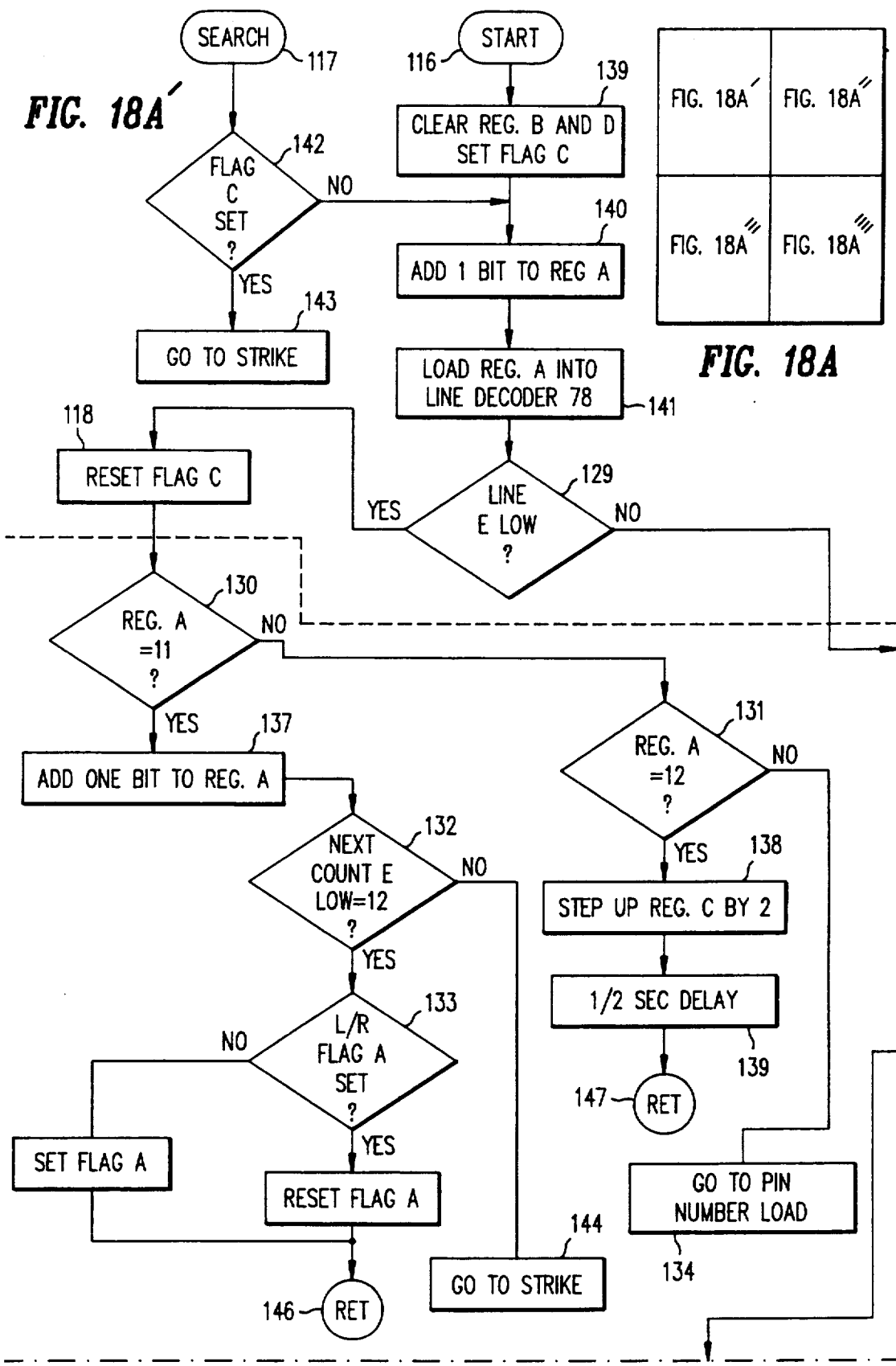

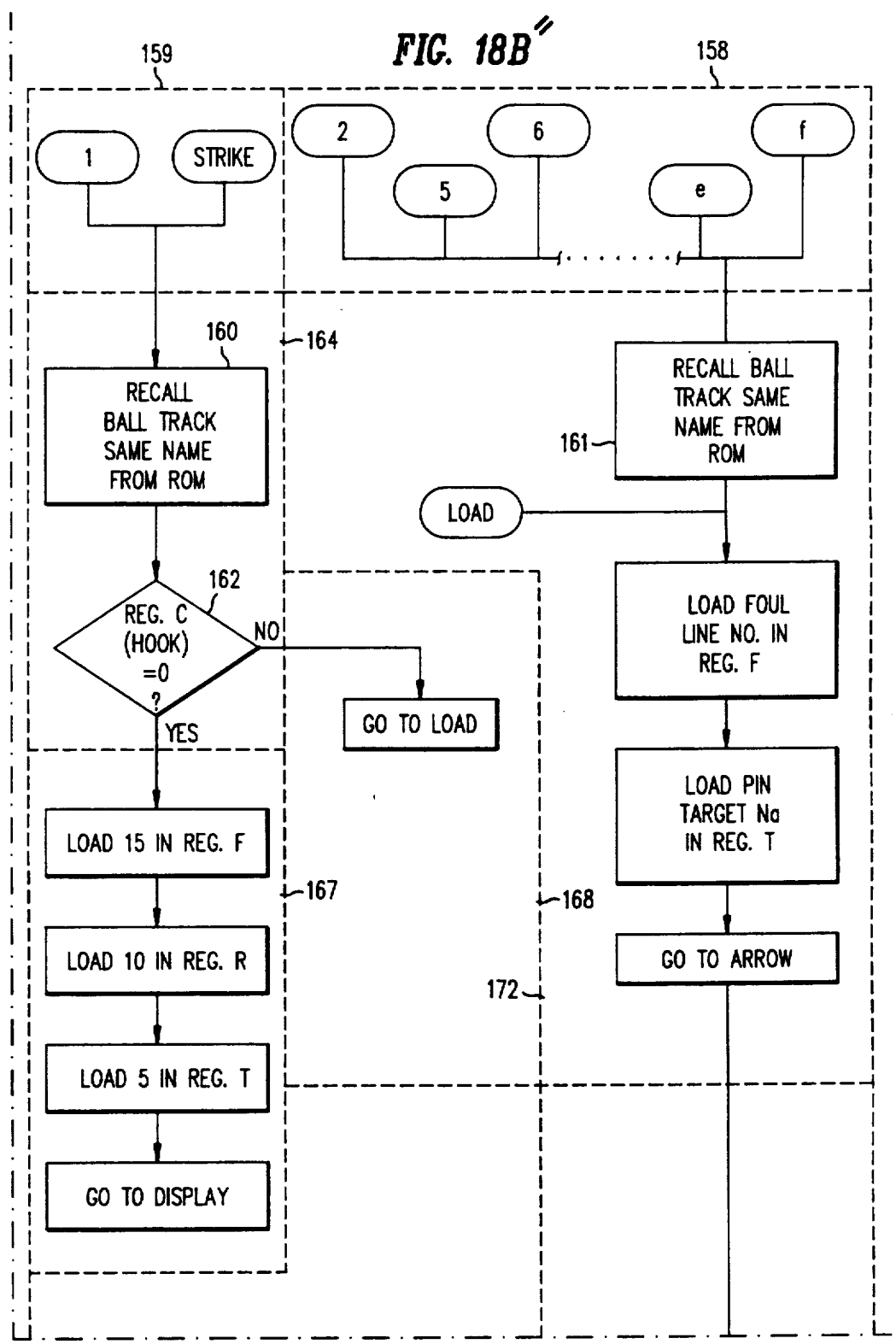

BOWLING TUTOR

BACKGROUND OF THE INVENTION

1. Field of the Invention

The present invention relates to hand held electronic devices and methods for instructing bowlers, and in particular to an improved device and method for displaying the correct path of the bowling ball for various standing pin configurations and different parameters that affect the actual path of the ball after being released.

2. Background Information

Bowling is a game so cleverly designed that a beginner can quite consistently roll the ball sixty (60) feet down the alley, and knock down many pins. Then it always appears that it will be easy for him to improve those early scores. However even the top experts rarely achieve a perfect score of 300. Although it appears deceptively simple to knock down all of the pins with one ball, it is in reality a very complex problem. Novice bowlers are usually told that to roll a strike (the first ball) they should aim for the "pocket" between the number one and the number two pins. This is not as simple as it appears, because the ball, for consistent results, must approach this pocket at an angle to the centerline of the bowling alley. This requires that the ball follow a curved path often referred to as a hook, as it approaches the pins. At the beginning of its path, the ball must have no curvature or a minimum curvature as it travels down one side of the alley until it approaches the pins. Then it must turn to follow a path that will hit the number five (5) pin which is on the centerline of the alley; after it hits the number one (1) and two (2) pins.

The necessary hook is achieved by the bowler giving the ball a spin around an axis parallel to the ball path. The dynamic factors that then determine the curve the ball follows are most complex. The sliding and rolling velocity relative to the alley surface changes, as it skids down the alley and, thus the coefficients of friction for rolling and sliding change. There are additional causes for the friction with the alley to be variable, such as the different kinds of treatments applied to different parts of the alley. The last third of the surface of bowling alleys are treated to have a higher coefficient of friction. As the ball approaches the pins, the total friction due to the spin increases the desired cross alley vector of the ball motion. The curved path that the ball follows therefore, is not a simple conic section or any other curve definable by a simple mathematical expression. There are many different alternate paths for the second ball depending on the configuration of pins still standing after the first ball has been thrown. This is because each different combination of pins left standing after the first ball, has its own unique requirements in addition to the difference in the friction parameters among alleys and delivery characteristics of each bowler.

It is not part of the natural abilities of the human being to visualize the complex curves the bowling ball will follow. The novice bowler is doomed to less than a desired score, in part, because he does the obvious by trying to aim the ball at the pins, which is never very successful. Rather than aim directly at the the pins, the most successful and professional bowlers get better scores by memorizing many different sets of three points on the ball path curves as required for each different bowling pin configuration. Then they precisely control their throw through the first part of the ball path. This is achieved by determining the point on the foul line where the ball is released and by aiming at a point about 15 feet down the alley, where markers are provided on a standard alley (hereinafter referred to as arrows). Then these experts make an additional minor adjustment based on experience, and a knowledge of where the ball should hit the pins. However, even the most experienced bowlers do have difficulty remembering many of the aiming positions, as is indicated by such memory supporting devices as charts on their bowling gloves, to help them remember more points.

The multiplicity of pins and the deflections of the ball by different pins and the very complex reactions from multiple impacts with rebounds between the pins as the ball continues to hit more of them causes many very different results for very small differences in where the ball first hits a pin. There are many more different results with the second ball rolled, which depend on the many different configurations of pins that can be standing after the first ball. The professional and expert bowlers try to remember as many of these different ball paths as possible. They then change their starting position and thus the point where they release the ball and where they aim the ball over the the markers or arrows on the alley according to the configuration of pins standing. Only with advice from a bowling coach do most novice bowlers learn the importance of the different ball release points and different points where the ball should be aimed for different pin configurations. Learning about some of these not so obvious factors, and how to deal with them, usually involves considerable time and a good memory. The bowling tutor of this invention stores the aiming points on the ball path in its memory for different pin configurations, and recalls the correct set of points for the pin configuration indicated.

The prior art discloses many different type devices to assist bowlers to aim their ball for better scores. There are many rather small mechanical analog devices which are separate, portable, and independent of the bowling alley and its equipment and instrumentation. Most such devices are based on the assumption that the ball follows a simple curved path. Said curved path is supported on one member, which is pivoted on a second member that has the markings of the bowling alley printed thereon. The physics that controls the ball motion is so complex, that any mechanical analog device such as these, based on a single, simple curved ball path can not provide an accurate indication of how or where to throw the ball for all of the different pin configurations.

The prior art also discloses various devices that are of an electrical or electronic nature but all are an integral part of the full scale bowling alley equipment and are integrated into the lane structure. These devices depend on the output of the pin spotter machines for the input and display of the configuration of standing pins. Many of these devices merely indicate by a lighted arrow on a display usually, directly above the pins on the alley, the target point where the ball should be aimed. In addition to where to hit the standing pins, the different lighted arrows on the display, point at the pins from different directions. The direction of the lighted arrow is supposed to indicate how the ball should approach the pins. In all of these devices. The display driving systems are all integrated into the pin spotting machines and receive their input directly from the pin grabbers.

U.S. Pat. No. 4,607,843 discloses an arrangement that uses input from the bowler, and recognizes the bowlers characteristics, provides an indication where the bowler should stand, and one other point on the path of his ball. However, this patent requires that the wood surface of the bowling alley be modified to install indicator lights therein, which is contrary to the requirements of the American Bowling Congress for bowling league play. The present invention avoids the shortcomings of the prior art by providing an improved portable electronic device and method for displaying and indicating the correct path to the bowler for various pin configurations, alley conditions and delivery characteristics.

SUMMARY OF THE INVENTION

The portable hand held electronic device of the present invention indicates through a simple display, the correct path for the ball to follow. The user has means to indicate to the electronics the degree of hook in the actual ball path resulting from both his personal delivery style and the alley conditions. This device has a shape similar to a hand held calculator and has printed on the face, the image of the standard bowling alley. The face of the unit which displays the bowling alley pattern has membrane switches under it, that provides input of the status of the standing pins. In one embodiment of the invention, a multiplicity of light emitting diodes are embedded in this image at points on the foul line, and at the position of the arrows, the equivalent of 15 feet down the alley, and adjacent the pins at the end of the alley. When energized by the on/off power switch the electronics automatically energizes 3 light emitting diodes on the preferred ball path for a strike. One energized light emitting diode is at the foul line, the second is at the arrow markers and the third energized diode is adjacent the pins and represents the target. The path that is indicated is therefore represented by the three diodes that are energized. The numbered circles representing the pins have input switches embedded therein. The status of the pins is input to the electronics by the bowler and the best ball path for the spare is then displayed by the diodes. A separate switch loads into the electronics the amount of hook, or curve of the ball path the player indicates he produces.

The major difference between the preferred embodiments is the number of paths displayed, and the number of different ball hook choices available, which effects the amount of electronic circuitry and logic required to connect the input data into the correct set of signals to the out put display to indicate the correct path.

It is therefore an object of the present invention to provide an improved hand held portable electronic device to indicate to a bowler the correct path for a bowling ball to follow under different bowling conditions.

Another object of the present invention is to provide a portable hand held electronic device for bowlers which permits the bowler to input data that can indicate the correct path of a bowling ball in a defined bowling situation.

A further object of the present invention is to provide an improved device and method which electronically converts data input from a bowler defining standing pin configurations and other parameters effecting the actual path of a bowling ball into a series of signals that simultaniously energize a combination of display indicators positioned on an image of a bowling alley to indicate the correct path that the ball should follow for the conditions specified by the input data.

Object and advantages other than those mentioned will be apparent from the following description when read in connection with the drawings.

DESCRIPTION OF THE DRAWINGS

FIG. 3 is a perspective view with a cutaway through the device shown in FIG. 1;

FIG. 4 is an exploded view of the membrane switch used as the input on the device shown in FIG. 1;

FIG. 9 is a truth table for the logic in FIG. 8, and FIG. 11;

FIG. 16 is the truth table for the right hand section of the second embodiment of the device;

FIG. 17 is the condensed truth table with the maxi hook specified for the second embodiment;

DESCRIPTION OF THE INVENTION

Figure 1:
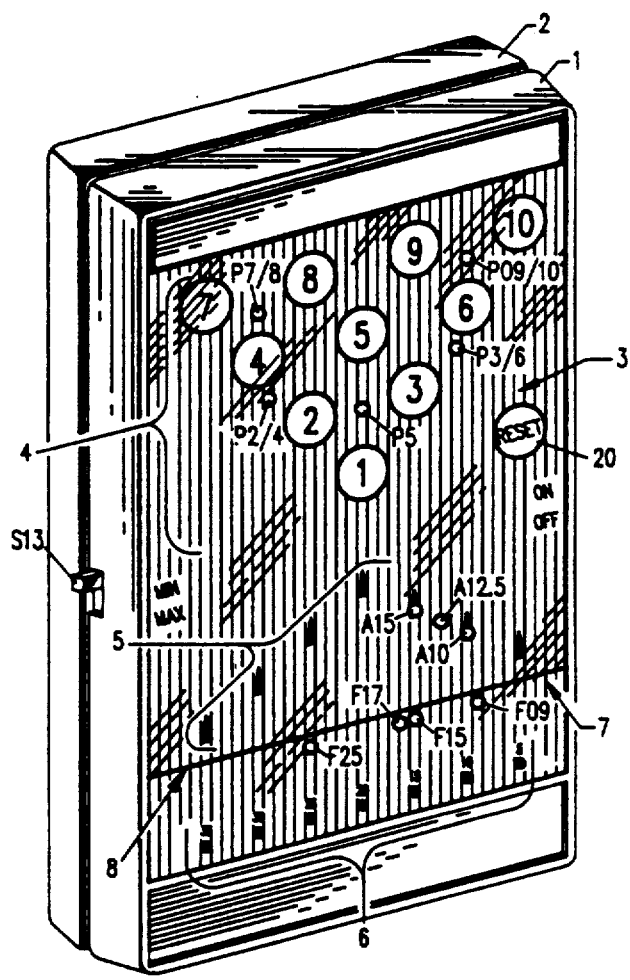
FIG. 1 is a perspective view of the device incorporating the present invention.

FIG. 1 is a front view of the device of the present invention with the plastic housing consisting of a rear cover 2, and a front part 1, with a static display label 3, on the front having a foreshortened image of a bowling alley, with ten circles 4, representing the position of the bowling pins. The numbers within circles 4 represent the numbers assigned to the bowling pins in those positions. A group of arrows 5, in a pattern similar to a chevron, are located on the display lable and correspond to the standard arrow markers on a bowling alley. The image of the alley also includes two rows of dots 6, behind the foul line 8. All of these markings on label 3, are as seen on the boards of a standard bowling alley. The numbers closely associated with the dots 6, are numbered on the label, according to the boards they are on, indicate the number of the boards counting from the right edge of the alley. The black lines 7, represent the edges of each of the forty (40) boards. The static display label also includes a group of circles adjacent selected markers 5. A third group of circles are positioned adjacent the pin positions 4 and represent pin targets for different standing pin configurations. Small transparent circles F09, F15, F17, and F25 are at the foul line of the image of the bowling alley, and small transparent circles A10, and A15, are in the arrows 5, on boards labeled 10 and 15 at said dots 6, and the transparent spot A12.5 is midway between said arrows A10 and A15. Transparent circles P5, P2/4, P3/6, P7/8, and P9/10 are between the said circles 4 that represent the bowling pins. The circles 4, and an additional circle 20, with RESET printed therein incorporate membrane switches, as will be described in detail later.

The transparent circles designated F, A, and P represent transparent areas of the label member 3 which is the top layer of a multilayered type membrane switch. The function of the transparent areas is to permit a selectively energizible display or light sources such as LED lamps to be disposed in registery underneath these areas to indicate the correct path for the bowling ball to follow, beginning at the foul line and terminating at a pin target.

Figure 2:
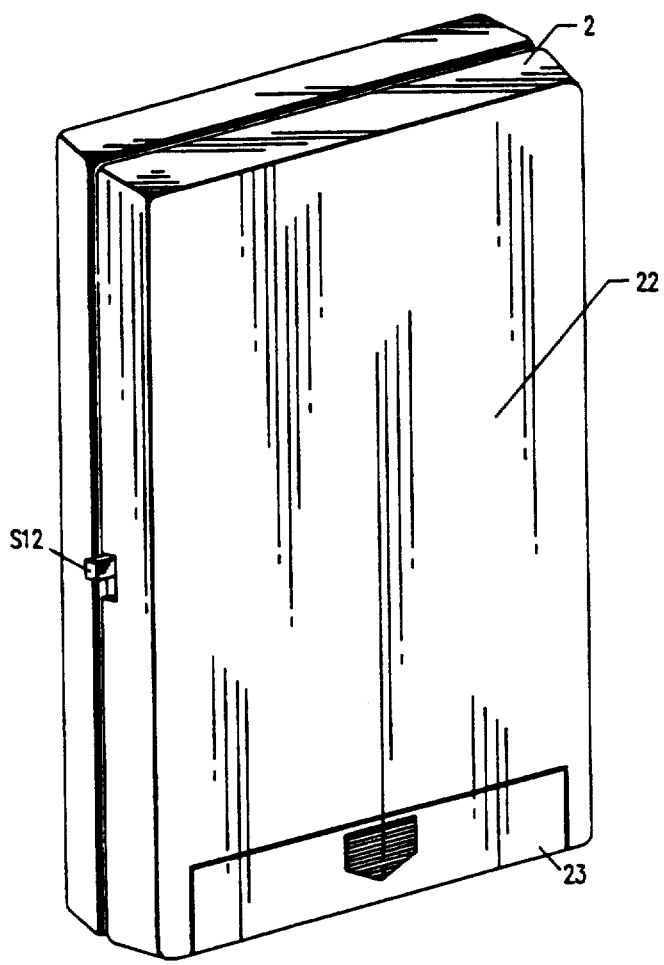
FIG. 2 is a perspective view of the rear of the device shown in FIG. 1.

As shown in FIG. 2, the operating instructions 22, are bonded by adhesive, to the surface of the rear cover 2, and a snap-in battery cover 23, is incorporated into the rear cover 2.

FIG. 3 illustrates how the printed circuit board 24, carrying all of the electronic circuits is mounted to the inside surface of the cover 1. Board 24 is supported at one end by the support 25, molded integral to the front cover 1, and the support 26, molded integral to the rear cover 2. The printed circuit board 24 is connected to batteries 27 by wires 28.

Slide switch S13 on FIG. 1, and the separate contacts of the membrane switch 31, illustrated in FIG. 4, provides all inputs to the electronics on the printed circuit board 24. The membrane switch consists of a combination of three (3) layers: the label 3, which has a conducting surface on its under side, (in contact with the ground lines of the printed circuit board,) the insulating spacer 29 in the middle and the under layer 30 on which are twelve (12) separate conductors. An input to the electronics results from pressing on one of the pin circles 4 or the reset circle 20 on the said label 3, which deflects the said thin label 3, down through the coincident holes in the spacer 29, making contact with one conductor of the bottom layer 30, of the said membrane switch 31, thus bringing one conductor such as 33, to ground potential of the printed circuit board. The label 3, the spacer 29 and the bottom layer 30 are bonded together with adhesive, and this bonded together assembly forms the membrane switch 31, which is then bonded with adhesive to the cover 1.

Membrane switches such as just described above are well known and are used in many types of equipment where the required currents and voltage are low and the environment is not too severe. However, a flexible extension of the bottom layer, often referred to as a pig tail, with a connector at the end is usually required. These are comparatively expensive and take up considerable space, all of which is undesirable in a pocket sized device such as the present device. Because the conductors are silk screened or otherwise deposited on the upper surface of the bottom membrane, direct contact with those conductors has not been practical, since the conductors are on the upper side of the bottom layer of the membrane switch. In addition, pressing multiple contacts on two surfaces together without a resilient material therebetween has often proved to be a nonreliable contact. Thus a multiple conductor with separate springs for each contact has proved advisable.

Figure 5:
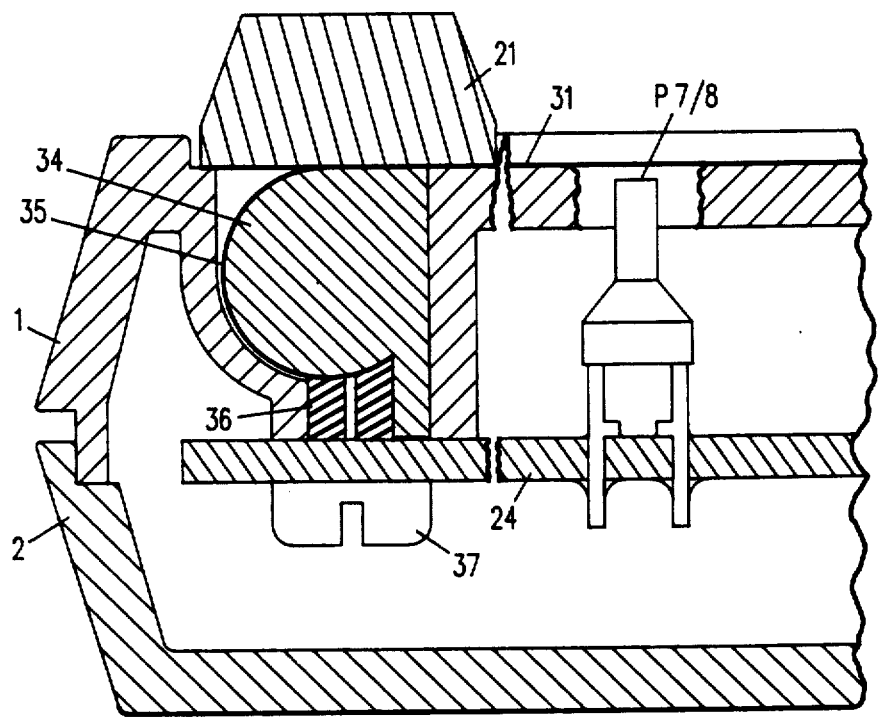
FIG. 5 is an enlarged view of a section through the membrane switch shown in FIG. 4.
Figure 6:
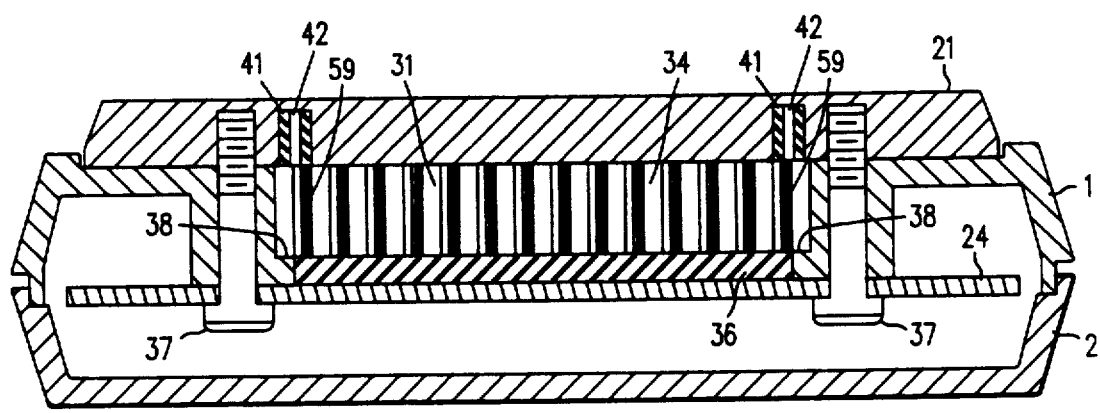
FIG. 6 is an enlarged cross section through the zebra conductor shown in FIG. 5.

In the present invention the means of making a simple, economical, and space saving connection between the printed circuit board 24 and the bottom layer 30 of the membrane switch 31 is illustrated in FIG. 5. As shown in FIG. 5, the short extension of the bottom layer 35 is wrapped 180 degrees around a mandrel 34, and the end of said bottom layer extension 35, is pressed against a zebra connector 36, which is thereby pressed against the printed circuit board 24, thus making good contact between the membrane switch 31 and the printed circuit board 24. The zebra conductor per se is a well known flexible soft compressible device almost universally used for surface connections between the glass surface of liquid crystal displays used as the face of digital watches, and the small watch printed circuit board. Screws 37 through the printed circuit board 24 are threaded into the name bar 21, as shown in FIG. 6. The housing cover 1, is thus clamped between the printed circuit board 24, and the name bar 21, fixing the distance between very precisely. As shown in FIG. 6. the ends of the mandrel 34, rest on the steps 38, which limit the compression of the zebra conductor 36, while the two soft plastic plugs 41, press tabs 40, shown in FIG. 4, hard against the silk screened ground conductors 59, as shown also on FIG. 6. This insures that the under side of the label 3 makes good contact with the bottom layer 30 of the membrane switch 31 and is at ground potential of the printed circuit board. The soft plastic plugs 41 are slightly longer than the depth of the holes they are in, and as the screws 37 are tightened the plugs 41, being made from tubing, and having a hole 42, through their center, collapse inward as they exert considerable pressure on the membrane switch 31, and press on the mandrel 34. This insures that it is firmly held against the steps 38 in the cover 1, assuring controlled compression of the soft zebra conductor 36 for a reliable contact while the same screws 37, cause the strong clamping action to hold the label tabs 40 of FIG. 4, firmly against the ground conductors 59 for a solid grounding contact.

Figure 7:
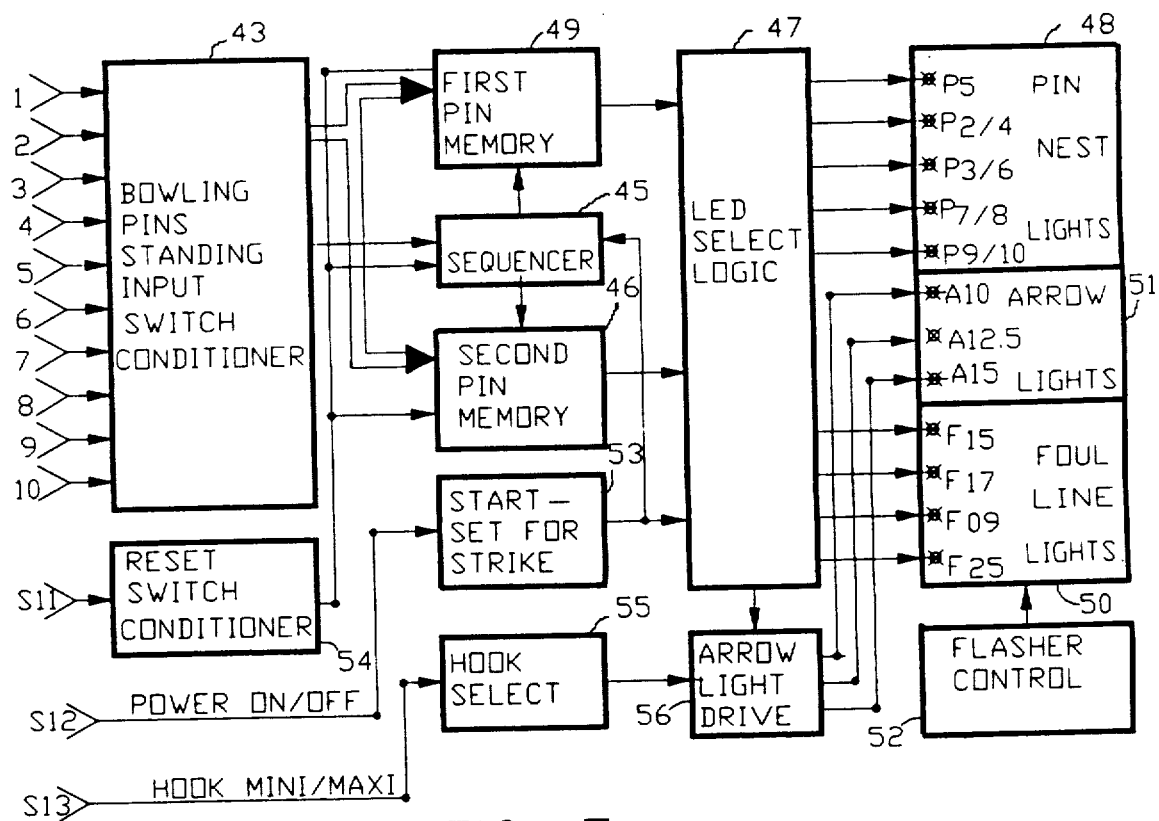
FIG. 7 is an functional block diagram of the electronics of the device shown in FIG. 1.

FIG. 7, illustrates in a functional block diagram the electronic circuitry employed to convert the information flow input of the position of bowling pins still standing to signals that energize the LED lamps to show the recommended ball path.

Switches S1, through S10, connect into bowling pin input conditioner 43. Conditioner 43 eliminates the switch bounce and shapes the input signal. The first switch closing number is directed to first standing pin memory 49, by sequencer 45, and the next switch closing is directed to the second pin memory 46, by the said sequencer 45. The sequencer 45 then blocks storage of additional switch closings, until the reset switch 11 is closed momentarily. Closing of switch 11 causes both memories 46 and 49 and the sequencer 45 to be cleared, so they are ready to start a new frame. The output of the first bowling pin memory 49, causes the LED select logic 47, to light one lamp in each block 48, 51, and 50. The arrow light final choice is determined by combining the input from the hook switch S13, conditioned by hook select 55, and the sequencer 45, with the signal from the LED select logic 47. When power is first turned on by switch 12, the lights are set to show the ball path for a strike, which is performed by the set strike box 53, which senses the power up condition and forces the sequencer to the reset condition which resets the display for the strike ball path for the first ball of the first frame.

The logic of the circuitry shown in FIGS. 7, and 8 requires that the user first input the lowest numbered pin still standing and then input the next lowest pin left standing, if any are left. As an option, other pins standing, can then be input, but they will have no effect. The nonclocked logic array 47, responds by switching on one LED in each of the three blocks for pin target lights 48, arrow lights 59, and foul line lights 50, depending on the outputs of the first memory 49, second memory 46, and the setting of the hook selector switch 55. As shown in FIG. 8, first memory 49 consists of two integrated circuits, each containing six (6) D type flip flops with separate input and output lines, and a single common reset and clock line. Second memory 46 is a single integrated circuit containing eight (8) D type flip flops, with separate inputs and outputs, and a single reset and a single clock line. Only one bit, representing any switch closure S1 through S10, is stored in each memory 49 or 46, FIG. 7.

Study and tests have shown that in every configuration of pins left standing after the first ball of a frame, a limited number of those standing pins dictate the best path for the ball. These must include the pins with the lowest numbers, and are in the row that the ball will reach first when thrown. A row being for example pins two, and three or pins four five and six. Either the ball or one of the pins the ball strikes must strike the pins in the second row and these pins in the second row may hit any remaining pins. After selecting the ball path to hit the target pins in the first two rows very few more choices remain. Thus a few of the lowest numbered pins determine the best ball path unless the standing pins are all in the back row, and are a near impossible split or have an obvious target between them. The best ball path then must always intersect with the lowest numbered standing pin or pins. This study limits the number of different ball paths. Therefore, in any standing pin configuration a few of the lowest numbered pins do determine the best ball trajectory. Thus the list of significant different pin configurations in the truth table is reduced, and the selection of the best path for any given configuration may be simplified.

Analysis, and experimental bowling indicate that there are many bowling pin configurations that seldom happen. An example is a spare where the back row of pins, numbered 7, 8, 9, and 10 are all knocked down, while all other pins are left standing. All such unlikely combinations have been eliminated in the list of pin configurations in the left hand column of the truth table, shown in FIG. 9. For all of the standing pin combinations listed, extensive analysis proved that the position of only the two pins nearest to the bowler are required to select a good ball path when the shape of the ball hook is fixed. Thus, a decision is made after the first, nearest pin is input and then that decision may be modified after the second pin position is input, as the data in the truth table indicates. More pin positions may be input but they will not change the decision. Another much expanded truth table of all expected pin configurations with more choices of the degree of hook is provided in FIG. 16, and discussed later.

Integrated Circuits Used in Novice Bowling Tutor:

| 2 input NAND | 74HC00 |
| Quad 2 input AND | 74HC08 |

| -continued | |
|---|---|
| Inverting Schmitt Trigger | 74HC14 |
| Quad 2 input OR | 74HC32 |
| Dual D Flip Flop | 74HC74 |
| Tri-state Quad Buffer | 74HC125 |
| Hex D Flip Flop With clear | 74HC174 |
| Octal D Flip Flop W clear | 74HC273 |
| Triple 3 input OR | 74HC4075 |
| 8 input OR | 74HC4078 |

Figure 8A:
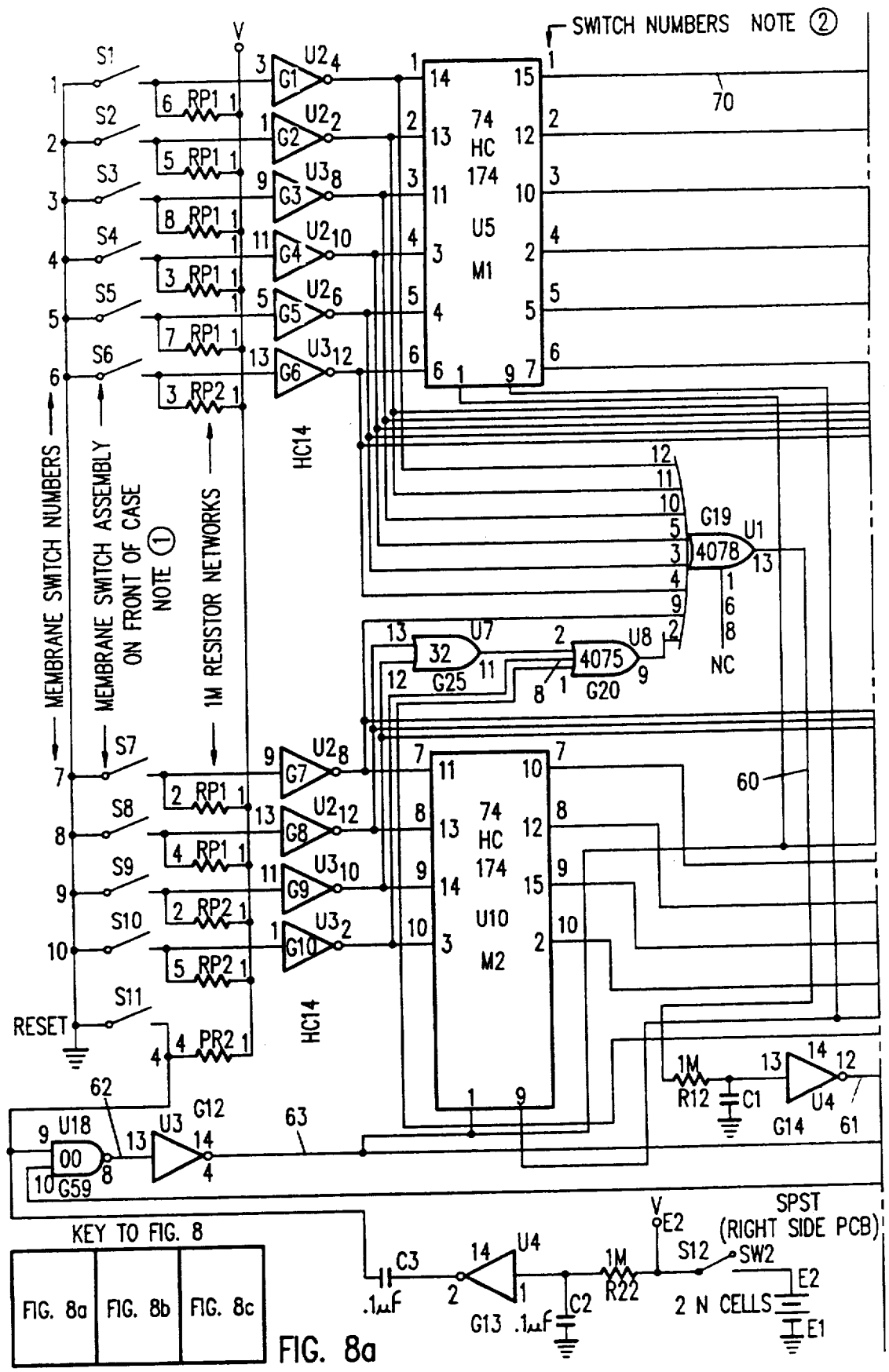
FIGS. 8a, 8b, and 8c is an overall schematic of the device for the beginner bowler shown in FIG. 1.
Figure 8B:
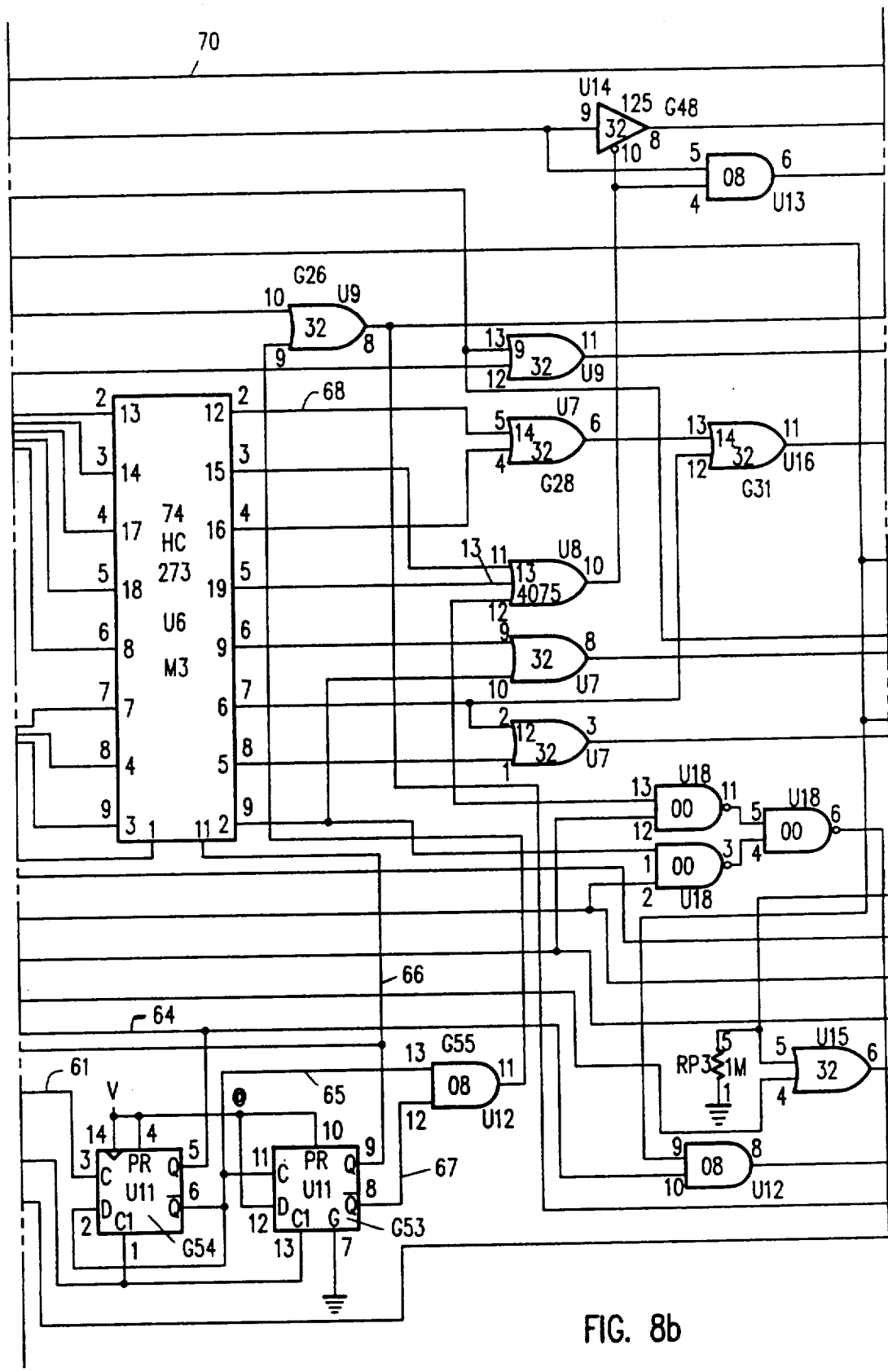
Figure 8C:
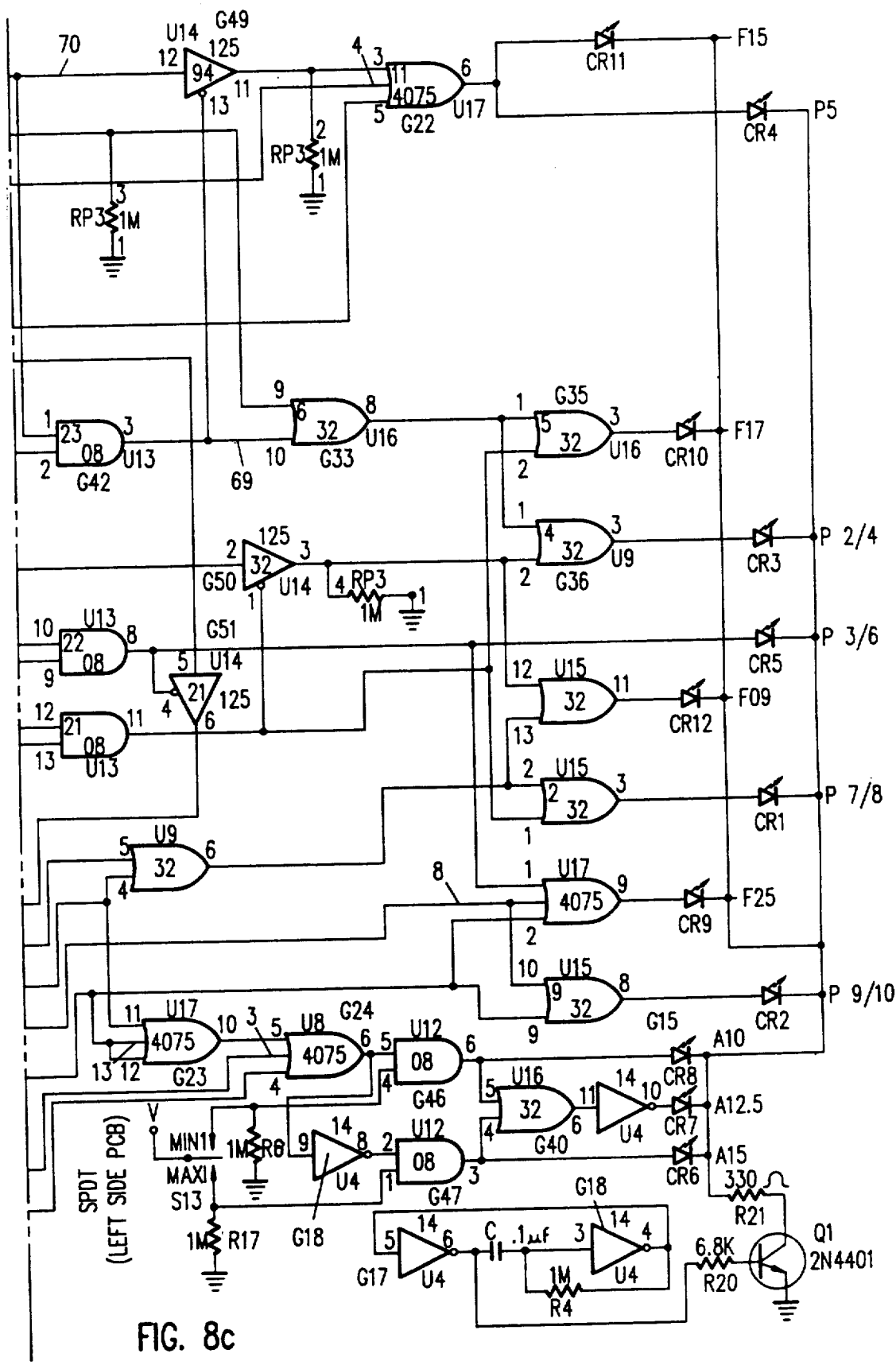

All of the circuits and logic on the schematic, FIGS. 8a, 8b, and 8c are on the printed circuit board except for the battery 27, and the membrane switches. Referring again to FIG. 8a, the resistors R1, through R11, clamp the inputs of inverters G1, through G10, high until any switch S1, through S10, contact is made, which will bring down to ground the input of any inverter G1, through G10, connected to any said grounded switch, thus raising said inverter output to battery potential, and through OR gate G19, or G20 or G25, line 60 is forced high and after a delay through resistor R22 and capacitor C2 causes the output of inverting Schmitt trigger G14 to go low, and through line 61 to pull the clock input of D flip flop G54 low. The delay is to allow time for the switch S1 through S10 to settle and provide a stable input to be stored in one of the 10 connected individual flip flops in the two (2) integrated circuits of the first memory consisting of M1 and M2. The clock input connected to line 61 being low will step sequencer 45, FIG. 8b, to advance when the first switch opens and the clock input to flip flop G54 rises and causes advancement to the next step, ready to load a second switch closing into the second memory M3, or equivalent block 46. To initiate a new bowling frame switch S11, FIG. 8a, is pressed. Closing switch 11, pulls the input of NAND G59 to ground, thus line 62 goes high and through inverter G12 line 63 is pulled low and this resets D flip flops G53, G54, and all memory flip flops in M1, M2, and M3.

The D flip flops G53 and G54 are coupled as a counter, and can count from zero (0) to two (2), and are used as part of the sequencer 45, FIG. 7. At the reset condition of flip flop 54, line 64, of D flip flop G54 is low and when any switch S1 through 10 goes high, after a delay to let the switch settle, and to raise the affected clock pin of D flip flops M1, and M2, FIGS. 8a, and 8b, said line 64, goes high and during this transition, clocks the memory flip flops M1 and M2 and causes the storage of the number of the switch that had just closed. D flip flop G54, having set drive line 64 high, simultaneously pulled line 65 low to cause flip flop G53 to be ready to reset on the next clock pulse and flip flop G54 to set on the next clock pulse. The next switch S1 through S10, that is will reset flip flop 54 and set flip flop 53, after a delay as before and result in a high on clock line 65, to G53 and thus cause a rising pulse on line 66, to store the number of this second switch closure in memory flip flop M3. The outputs of the inverters G1 through G10 are connected individually to different flip flop in either the hex flip flop integrated circuits M1, or M2, and some are also connected to the different flip flops in integrated circuit M3, but the sequencer 45, FIGS. 8a, and 8b, only sends a clock pulse to memory M1, and M2, or to memory M3, to insure that each switch closure can only be stored either in first memory M1 and M2 or in second memory M3.

The SPDT switch S13 FIG. 8C provides the bowler with a means to indicate the degree of hook he achieves with his ball. The difference in the output between a "MINI" and "MAXI" switch S13, setting determines the selection of the arrow lights A10, or A12.5, or A15, in the ball path. To minimize the circuit logic one of two arrow lights, either A10, for "MINI" or A12.5 for "MAXI" is energized by default, unless the ball path should be moved more to the left, and then the next higher light A12.5 or A15 will be energized by the logic gates G18, G15, G40, G46, and G47. Depending on the position of the single pole double throw switch S13, either light emitting diode (hereafter referred to as LED) A10 or A12.5 should be energized and glowing, but if through gates G23, or G24, high level inputs are received from up stream logic sources, through OR gate G23 and/or OR gate G24 the driven LED one position higher, will be energized. For example A10, should change to A12.5, but only one of the three (3) LEDs can ever be energized at a time. With SPDT switch S13 at the "MINI" position a voltage will be applied to one input of AND gate G46, and if the output of OR gate G24 is also high said AND gate G46 will also be high and energize LED A10, but if gate G24 has no output AND gate G46 out put will be low and therefore the OR gate G40 output will be low into inverter G15, and said inverter G15 out put will be high and energize LED A12.5. Thus by default, the higher numbered LED is energized. If the SPDT switch S13 is at the "MAXI" setting then AND gate G47 will only have an output when the output of inverter G18 is high which can only occurs when the input coming from OR gate 24 is low, and this will energize LED A15. But without an output from either gate G46 or G47 there will be no output from OR gate G40, thus the out put of inverter G15 will be high resulting in energizing LED A12.5. Resistors R17 and R18 insure that inputs are clamped to ground when the SPDT switch S13 is not holding them at voltage.

The logic, in total, energizes three LEDs one of which will have a "P" prefix and be one of the lights in the pin circle area 4, on FIG. 1, and one LED will be in the arrow area 5, with a "A" prefix, and one will be at the foul line 6 area with a prefix "F" Since the load consisting of three (3) LEDs is constant, one resistor R21 FIG. 8c can limit the current to all of the twelve (12) said LEDs. Transistor Q1 causes flashing of the three (3) LEDs to make them easier to observe. Transistor Q1 is base driven by a very conventional multivibrator consisting of inverter gates G16 and G17, capacitor C4, and resistors R19, and limiting base resistor R20.

When the power switch S12 is closed the LEDs must indicate the correct path for a strike to start the first frame of the game. To achieve this, closing switch S12 immediately provides energy to all of the other logic, except for a delay through resistor R22 and capacitor C2 to inverting Schmitt trigger G13, which produces a momentary but delayed pulse that pulls G59 low through capacitor C3, after all of the logic circuits are stable. Thus through conductors 62 and 63, clearing or resetting all of the D flip flops in memories M1, M2, M3, and the sequencer 45, which prepares all circuits to start another frame of bowling. With the D flip flops G53, and G54, reset conductor lines 65, and 67, (Q-not from each) are high and thus the output of AND gate G55 is raised and drives the OR gate G26 output high, and this drives 3-input OR gate G22, high that drives LED F15, and LED P5, and drives OR gate G24 to energize either LED A10, or LED A12.5, depending on the position of SPDT switch S13, as previously explained, and thus the ball path is displayed for a strike: the first ball of a new frame, as indicated in the first line of the novice truth table.

The gates not yet mentioned are dedicated to logic to drive the LEDs to conform to other lines of the right hand side of the novice truth table. In FIG. 8a. For example, when switch S1 is pressed, the output of one D flip flop in integrated circuit hex D flip flop M1, is latched by the process previously described, and this raises conductor line 70, and through tri-state buffer G49 raises the output of OR gate G22, which drives LED F15 and LED P5, and since there is no connection to AND gate G46, LED A12.5 or LED A15 will be energized, depending on the position of SPDT SWITCH S13, to indicate the ball path for hitting the number one pin. If switch S2 is then pressed this pin number will be stored in the first flip flop of octal D flip flop integrated circuit M3 by the process previously explained and the output of that flip flop will raise conductor line 68, and through OR gates G28, and G31, raise one input of AND gate 42 and since line 70 has been held high by the output from memory flip flop M1, the output of AND GATE G42 will go high and hold conductor line 69 high, and this will switch tri-state gate 49, off and thus turn off LED G15 and LED P5 and through OR gates G33, and G35 and G36 energize LED F17 and LED P2/4, and the arrow light will remain the same because from memory M3, the stored switch position S2, does not connect and raise gate G24 to change the arrow light.

Gates G48, G49, G50, and G51 are tri-state buffers, in which the output is put in the high state when the control input is high. These tri-state buffers are used to block the logic path opened by an output of first pin memory 49, when a alternate output is required as the result of an out put from second pin memory 46. Depending on the single switch pressed or the combination of two switches pressed other selections of LEDs will be energized, to conform to the FIG. 9 truth table and will follow the same process, and will be easily understood by those versed in conventional digital logic. The total number of different pin combinations is the same as the number of lines in the the truth table of FIG. 9.

Integrated Circuits used in the Novice Right/Left Bowling Tutor are:

| | |
|---|---|
| 4, to-16 Line Decoder | 74HC4514 |
| Single-Chip CMOS Microcontroller | COP413C |
| 3-to-8 Line Decoder | 74HC237 (3) |
| Inverter | 74HC04 |

The left hand bowler needs to have an indication of a path with a hook that curves to the right, passing over the arrow marks on the left side of the alley. Those versed in the art will readily recognize that this can be achieved by use of a mirror image of the printed circuit board 24, of FIG. 6, and the addition of the mirror image of the holes for arrow lights A10, A12.5, and A15 and the foul line lights F09, F15, F17, and F25, as shown in FIG. 1.

Figure 10:
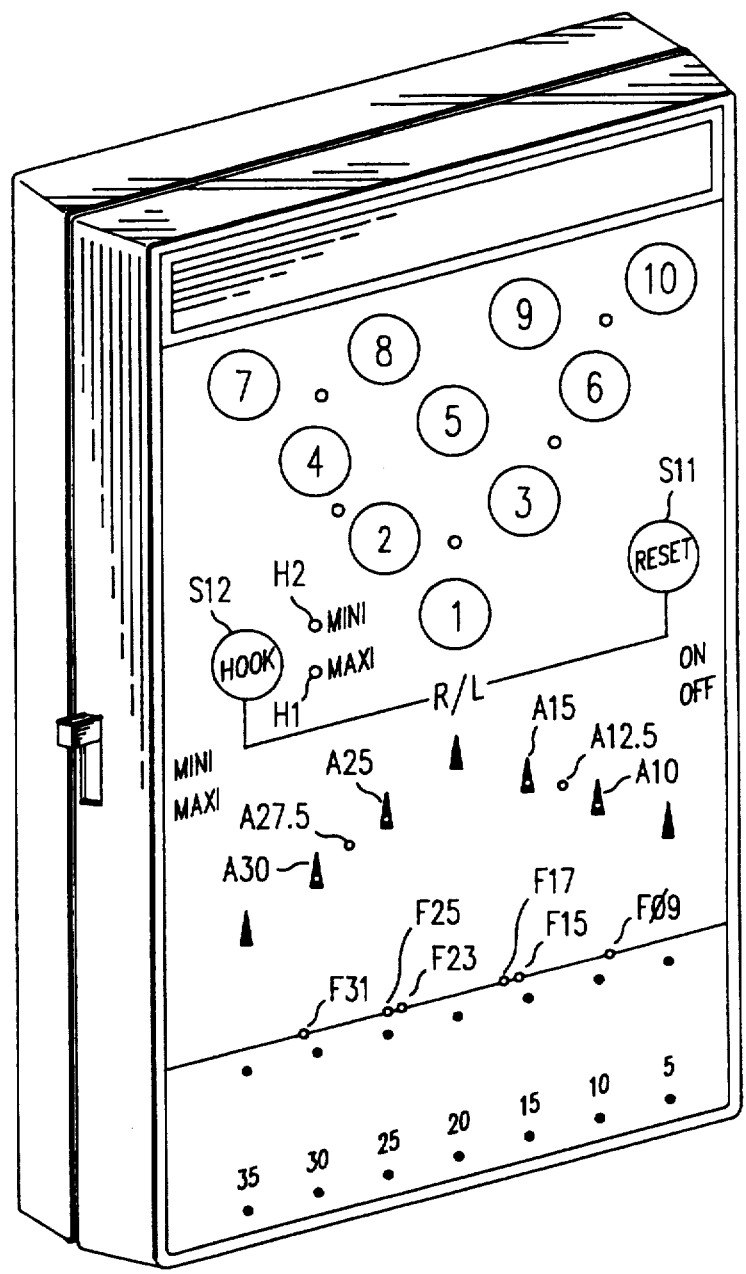
FIG. 10 is a perspective view of the invention providing a novice version for both left and right hand bowlers.

However, a device employing a more flexible alternate is shown in perspective view FIG. 10. The exterior view of the device for use by both left and right handed bowlers provides indicator lights F31, F23 added at the foul line and A25, A27.5, and A30 lights added at the left hand arrow positions of the design shown in FIG. 1. Lights have also been added to indicate the degree of hook and labeled H1 and H2, and a switch S12 has been added to the membrane switch assembly, which toggles the degree of hook calculated for the ball path, and so indicates the degree of hook by illumination of either light H1 or H2, which are labeled MINI and MAXI. By holding down the reset switch S11, and then pressing the "hook" switch S12 the device can be toggled between the left and right hand indications. With the hook light at MAXI, identified as H1, on FIG. 10, a strike ball path lights P5, A10 and F15 to indicate a right hand setting. When the tutor has been toggled to the left hand setting lights P5, A30, and F25 are lit to show the left hand strike ball path.

To be assembled from all standard off the shelf inexpensive integrated circuits would require many more logic devices for the additional functions for the device to accommodate both right and left handedness. The extra packages will also not fit on a printed circuit board similar to printed circuit board 24, FIG. 3. To fit in the same housing as shown in FIG. 1, a simple circuit arrangement shown in FIG. 11 employs a small microcontroller 76, having only thirteen (13) inputs/outputs, and four (4) standard off the shelf integrated circuits, 75,77,78, and 79, to perform all of the functions required to sense which switches S1 through S12 are closed and to indicate the selected ball path. This single chip microcontroller contains a very small Read Only Memory, referred to as a ROM, and a small Read Alterable Memory, usually referred to as a RAM, and a arithmetic unit so it has the ability to perform all of the necessary data processing functions required. A small truth table can be stored in the ROM. A four (4) to sixteen (16) line decoder 75 reduces the twelve membrane switch inputs 1 through 12, to a four (4) bit binary code usable by the microcontroller 76. Three (3) different three to eight line decoders 77, 78, 79, selectable by the microcontroller 76, hold and drive the selected output lights.

Figure 11:
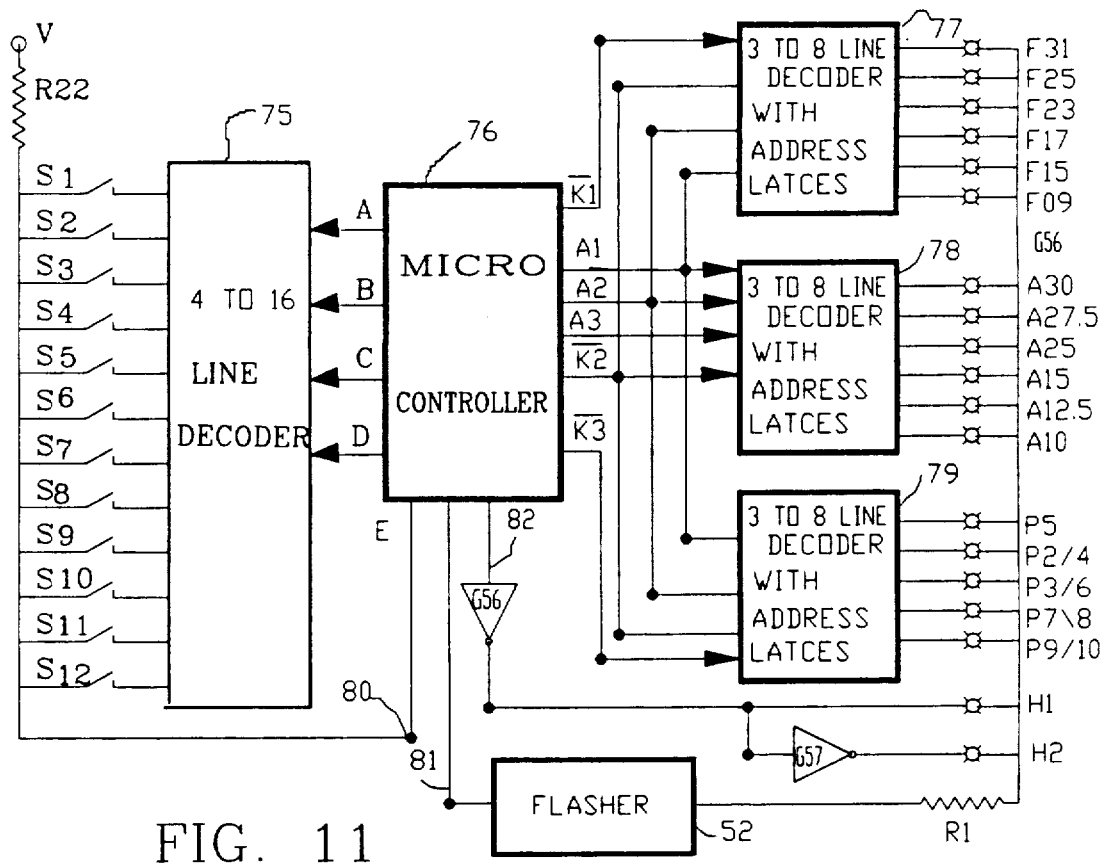
FIG. 11 is a circuit diagram of the functional block shown of the device in FIG. 10.

The operation of the circuit arrangement shown in FIG. 11 is explained in connection with the flow diagram of FIG. 12. Microcontroller 76 FIG. 10, in the input mode counts continually from zero (0) to fifteen (15) with a binary output on lines A, B, C, and D, to the line decoder 75. All of the twelve outputs of the line decoder 75 are clamped high, except any line that represents the base ten number equivalent to the binary coded inputs A,B,C, and D. That line is pulled low by the integrated circuit chip 75. When the count from the microcontroller reaches the equivalent of the base ten number of a closed switch, S1 through S12, line 80, which has been clamped high by resistor R23 is pulled low and input E indicates to the microcontroller program to store that switch number in binary form.

The microcontroller 76 is free running and continues to generate outputs to the three to eight line decoders 77, 78, and 79, based on the inputs received from switches S1 through S13, which indicate which bowling pins are still standing. The line decoder 77, 78, and 79, each has an internal address latch which holds the selected lamps constant, except when the input K1, or K2, or K3 is low, and this provides a means for the microcontroller 76 to multiplex its output to the line decoders 77, 78, 79. For example, decoder 77, will hold one of the lights F27.5, G31, F15, F17, F19 or F25 energized until the microcontroller pulls K1 low. Resister R21 limits the current through the LEDs. The flasher 52, is similar to that used with the transistor Q1 in FIG. 8, but in this case the transistor Q1 is driven directly by the microcontroller 76. Line 81 on FIG. 11 is alternately held high and then low by the microcontroller 76 by a well known simple program routine that causes all of the energized LED's to cycle on and off to make them more obvious.

The software program, must be limited in length, because it is also stored in the small microcontroller chip 76. This is possible because as, explained earlier, many possible standing pin configurations do not need to be considered.

By storing the input of pins standing in numerical order starting with pin one, which is in rank order, the usual random search to find the lowest pins is eliminated. When the program starts at the low end of the memory register, the first non zero number found is the lowest pin standing and the second non zero number is the next to lowest pin.

Figure 12:
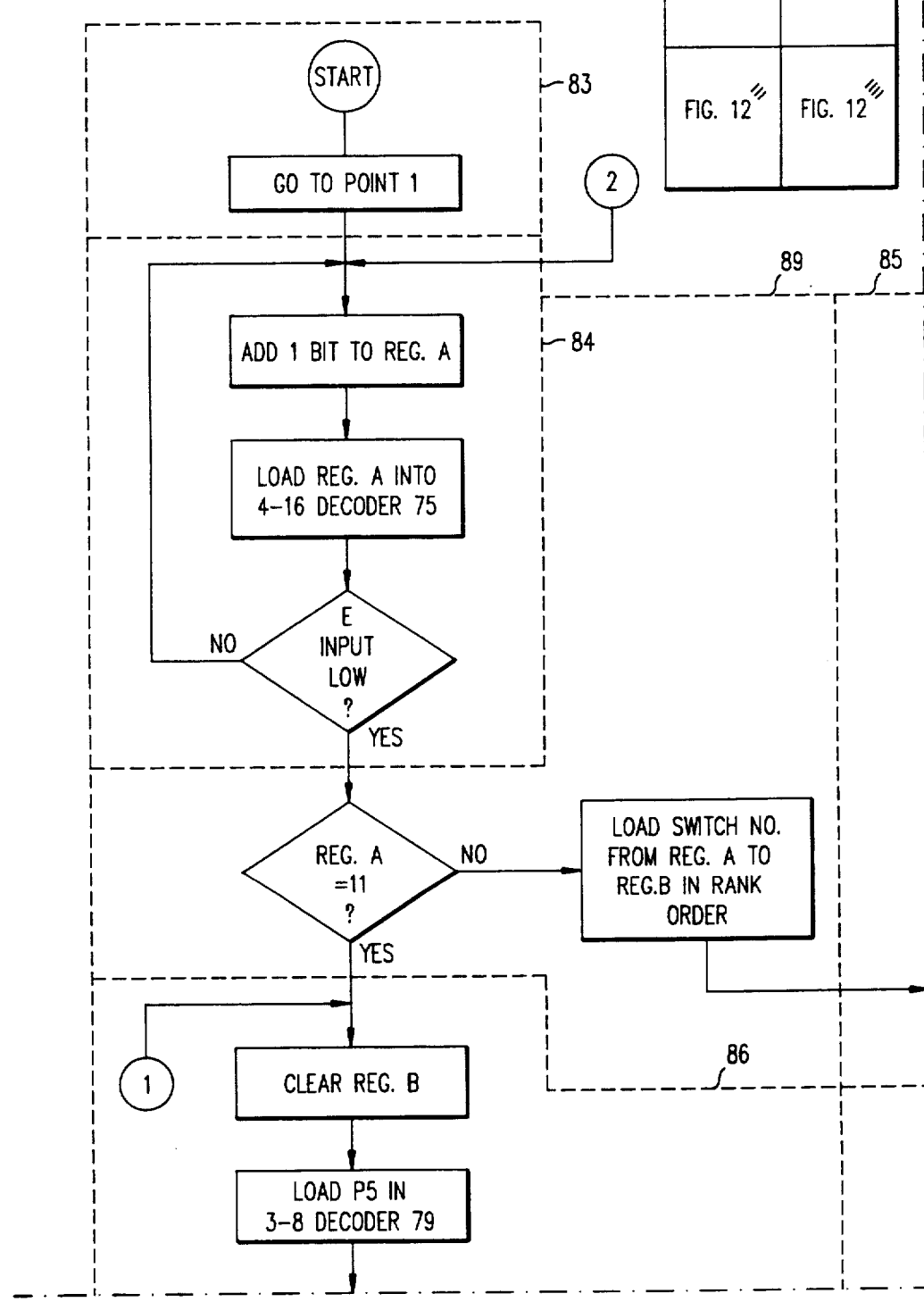
FIG. 12 is a flow diagram of steps of the method followed by the device of FIG. 10.
Figure 12:
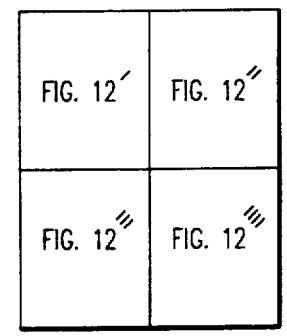
Figure 12:
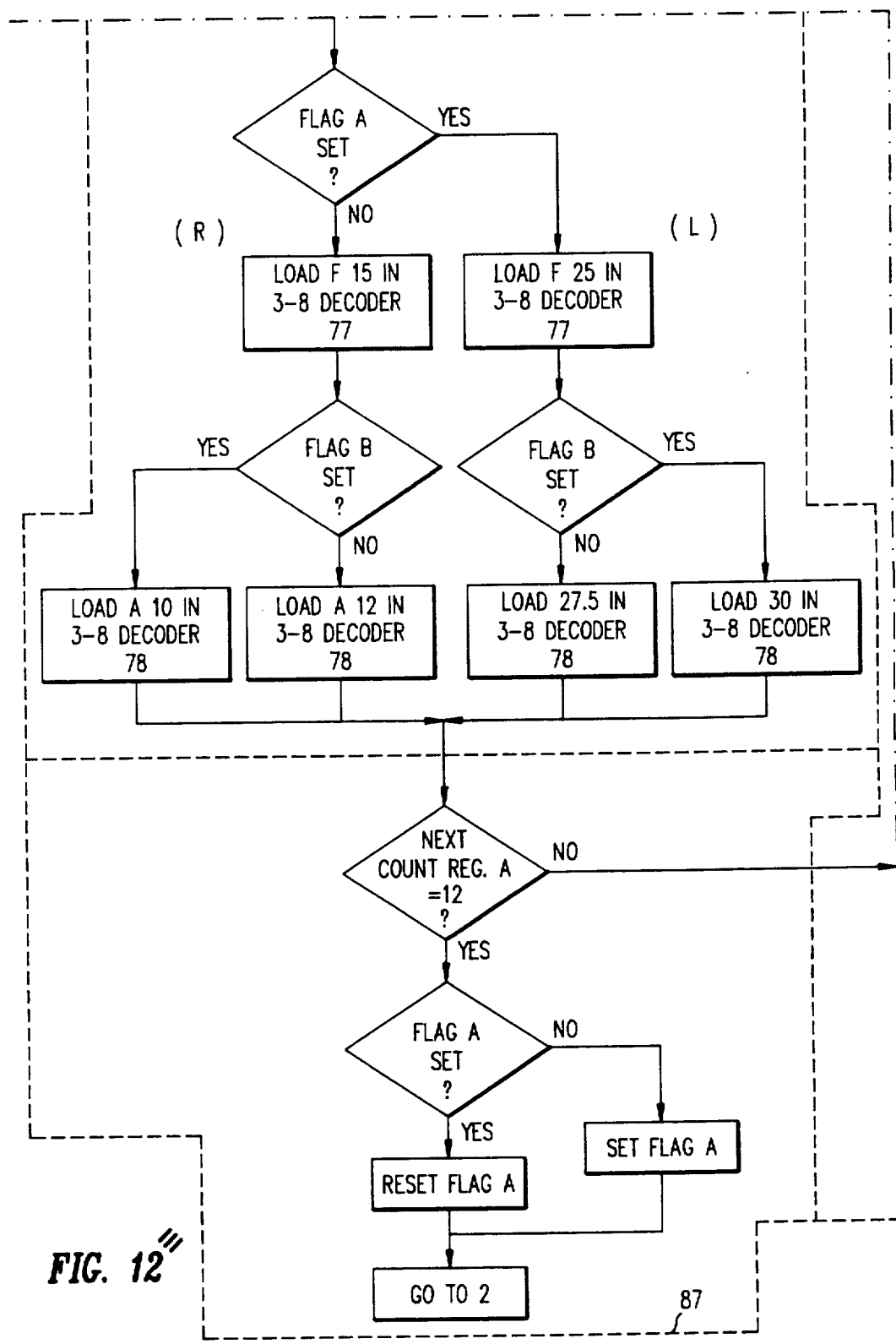
Figure 12:
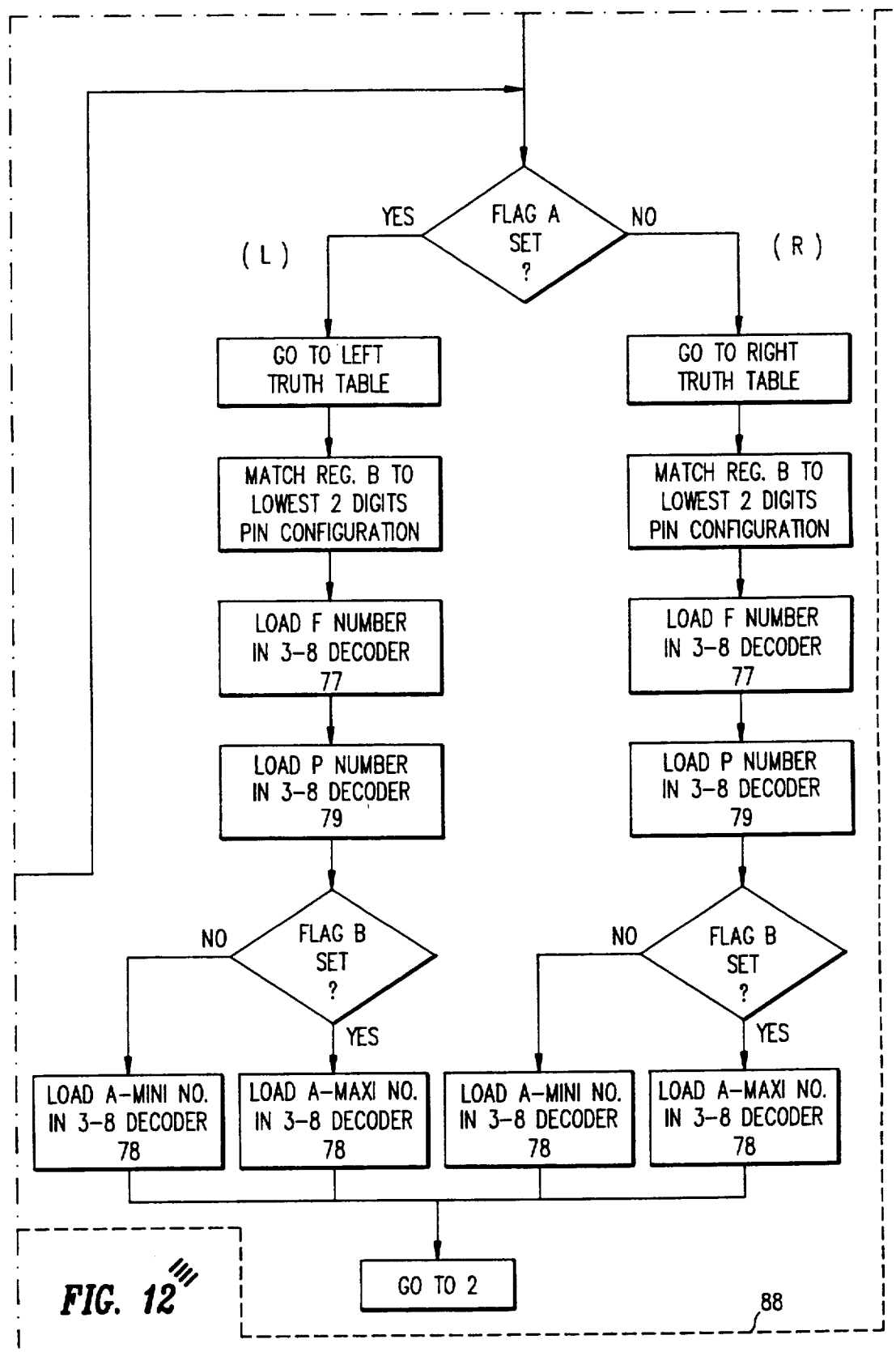

The switches, and lights, referred to on the flow diagram FIG. 12, are shown on the circuit diagram of FIG. 11. Each primary function on the program flow diagram FIG. 12, is enclosed by dotted lines. The start function 83, only occurs when power is first applied, and shifts the program to function 86 which sets up the lights to show the ball path for the first strike. After the lights are set for a strike, the program always returns to the free running input switch search function 84, which is a short loop that continues until one or more switch closures are sensed. Sensing reset switch 11, drives function 86 causing the lights for a strike to be displayed, and clears the memory of pins standing in register B, and thus forces the device to be ready for another frame of bowling. When the reset switch 11, and hook switch 12, are held closed simultaneously, the standing pin memory register B is cleared and the lights display a strike ball path, and function 87 causes the program to toggle from right hand to left hand or vice versa. Then when the hook switch is opened first the strike ball path changes, and the alternate handedness is indicated. This is obvious to the user, because the foul line and arrow lights will change to the opposite side of the alley. Any time that hook switch 12 alone is closed the program goes through function 85, and changes to the alternate hook setting, which is held in Flag B, and indicated by LED H1 or H2. When flag B, is set, line 82 FIG. 11, is held low, which causes the inverter G56 output to go high and drive LED H1 to indicate the system is set for maximum hook. When Flag C is reset, the output of inverter G65 will be low and will cause the input to inverter G57, to be low and thus the output of inverter 57 will be high and cause LED H2 to be turned on indicating a minimum hook condition. When any switch except reset switch 11, is closed, the program goes to function 89, and stores that switch number in register B in rank order of the flow diagram as shown in FIG. 12, unless twelve has been stored in Register A. Then the program passes through block 85, and selects the right or left part of the truth table, shown in FIG. 9 in block 88, depending on the status of Flag A. In block 87 the comparison with the bowling pin configurations in the truth tables starts at the least significant number position in register B and compares the first digit and then the second digit found, if a second standing pin number has been loaded. Then the line of the selected truth table corresponding to the configuration of the standing pins stored in register B, is selected and this causes a display of the three LEDs called for on that line. The program then returns to monitoring the input switches in function 84 for another input.

Figure 13:
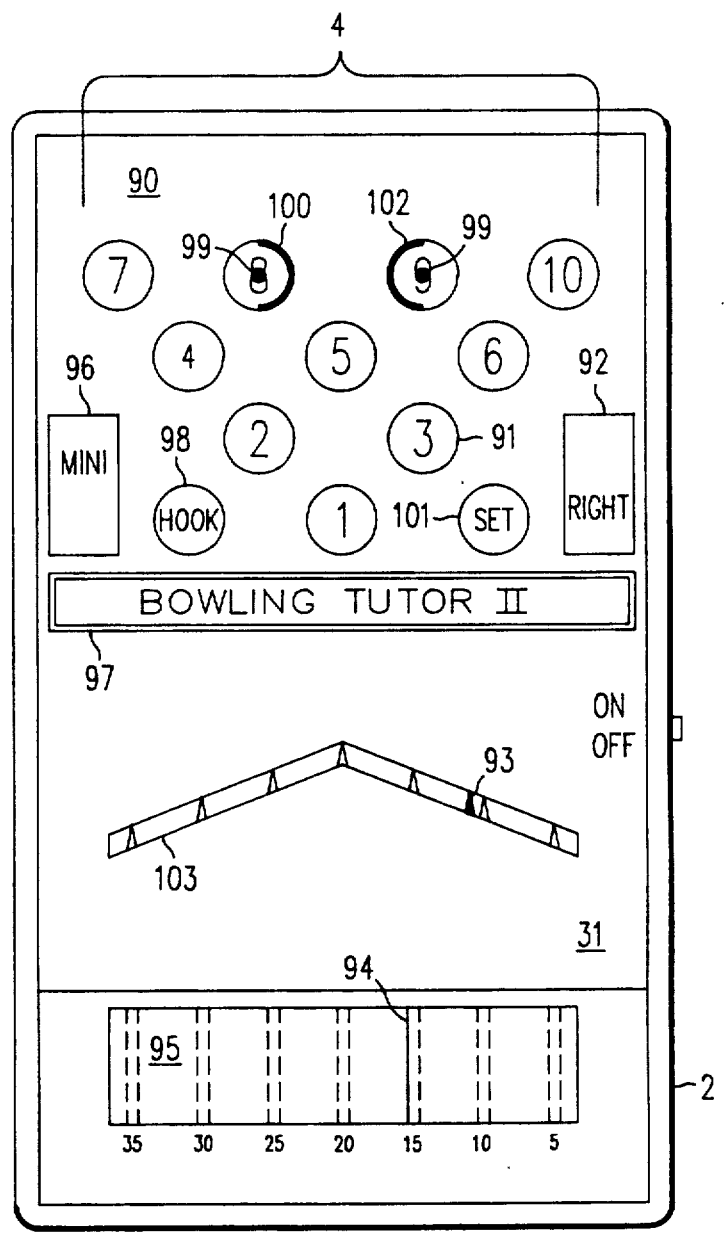
FIG. 13 is an example of the display for the ball path for inputs of pins standing of a second embodiment.

FIG. 13 is a perspective view of another embodiment of the invention for an advanced or experienced bowler, who has precise control of his ball, and who can use a greater number of different degrees of hook for different spare situations, and can respond to more refined directions. To provide a display with more detailed directions to the bowler in this version, liquid crystal displays are used rather than LED lights. The liquid crystal display, hereafter referred to as a LCD, is best known for its very common use as the face of digital watches, and similar devices. It consists of two layers of glass between which is a liquid that forms a crystal type structure that is reorientd and becomes opaque or black when a voltage field is applied across sections of it. There is almost no electric current flow through an LCD, and almost any shape can be created to appear and disappear on its surface.

For this application the membrane switch/label 31 FIG. 4, is slightly modified to have additional transparent openings through which the LCD can be seen. The spacer 29 has openings at the bowling pin positions, as before, and openings at the foul line and the arrow positions through which the LCDs can be seen. On the bottom layer the conductive spots 32 under the pin position circles 4, are transparent. These were not requirements where lights were visible through separate transparent areas in the label and spacer, such as F25, A15, and P7/8 of FIG. 1. The conductor pattern 32, FIG. 4 when transparent is the same as illustrated but is not visible. Several well known and readily available processes, including thin metal film evaporation are practical for producing these transparent conductors. In the LCDs short lines 94, triangles 93, dots 99, half circles 100, and 102, and single words 92 and 96, in FIG. 13, and circles 109, FIG. 14, in the glass are used to indicate the ball trajectory, and the status of the ball path selection process.

At the foul line, LCD lines such as 94 in FIG. 13 indicate the position and direction the bowler should follow as he approaches the foul line to release his ball. These embedded lines terminate in the same position on the display as the LEDs F09, F15, F17, F23, F25, and F31 on FIG. 9, and are given these same labels in the truth table shown in FIG. 16, as were used earlier. However, the embedded LCD lines are not visible until voltage is applied to one, to indicate it has been designated. With more degrees of hook available more positions in the chevron shaped LCD 103 are needed to direct the advanced bowler than there are visible arrows on the standard bowling alley. The truth table of FIG. 16, calls for the display of positions on boards of the bowling alley which do not have arrows on them such as boards 8, 10, and 14. All of the arrows that are found on a standard bowling alley are visible as open FIG. 13, triangles on this embodiment of the invention. For example, standard bowling alley arrow 93 is filled in, indicating it is on the ball path selected. Other arrows show as solid black triangles when they are on the selected ball path, but otherwise are not visible.

As illustrated in FIG. 13, dots 99, appear in the middle of the pin position circles 4 as they are pressed, as feedback to the user, to indicate that a standing pin position has been stored. These central dots 99 indicate to the user that the device has sensed closing of the indicated switches S1 through S10, and has stored the input of a position where a pin is still standing. Any number of switches in circles 4 can be pressed and each will then have its center filled with a liquid crystal display black dot similar to dots 99. The great merit of this method of input of the data consisting of pins standing after a strike, is that it is intuitively obvious and very natural for any person when he views the remaining pins at the end of the bowling alley. The input is a geometric analog of the physical pin positions. The dots appearing in the center of the pin circles provides the means for a direct comparison with the position of the standing pins on the real alley to detect errors.

As the using bowler presses any of the different circles 4, in any sequence, the tutor will continue to calculate and indicate the correct updated best ball path for the recorded input of pins still standing. In FIG. 13 two switches S8 and S9 have been pressed and the Tutor has indicated by the two black half circles 100 and 102, produced by a liquid crystal display that the ball should pass between pins eight 100 and pin nine 102. Also the device is indicating that the ball path should cross arrow 93, after leaving the foul line at the the foul line marker point indicated by line 94.

The advanced version of the bowling tutor has four (4) degrees of hook available, with the acting one displayed in box 96, with "MIN" appearing in the example of FIG. 13. The other three that can show are "FLAT" for flat, or a straight ball, "AVGE" for average and "MAXI" for maximum hook. By sequentially pressing the hook switch 98 the different degrees of hook will appear one after the other in the box 96. In the box 92 FIG. 14 choice for a right or left handed bowler will be displayed, and this will toggle between "Right" and "Left" as the combination of the "Reset" switch 101, and the "Hook" switch 98 are both held closed in the same manner as with the left/right version previously described. There are six (6) different points on the foul line LCD 95, FIG. 13, from which the ball path may start, and one of the start points will always be displayed as a line at the designated board position. The target for the ball among the standing pins is indicated by half circles around adjacent pins 100, and 102, or a black ring 109, shown in FIG. 14 around one pin position.

Figure 14:
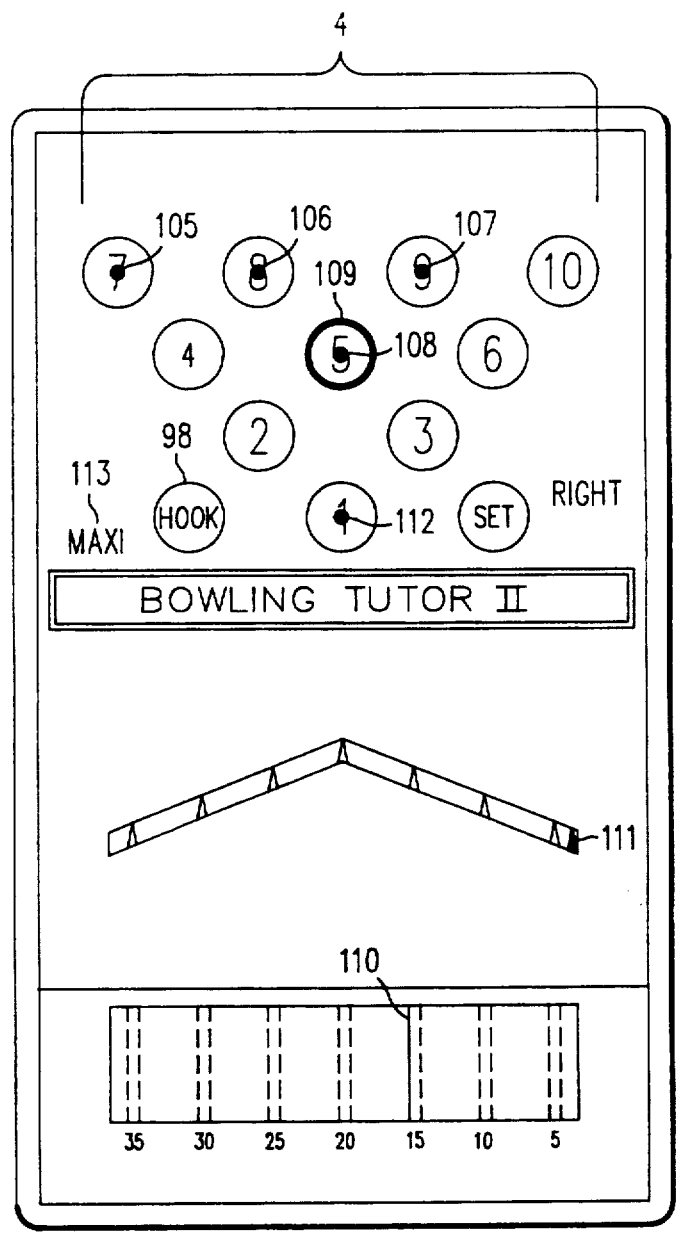
FIG. 14 is another example of the display for an input of another combination of pins standing of the second embodiment.

FIG. 14 illustrates the display that results, when the MX hook 113 is selected, and pins 1, 5, 7, 8, and 9, in circles 4 have been pressed and feedback is indicated by black center dots, 105, 106, 107, 108, and 112, and the black ring around pin five (5) 109, indicates that this is the pin to hit. The ball path should start from the foul line over the dots in the center of board (17) indicated by the black line 110, and should pass over the arrow in the center of board eight (08) indicated by the black triangle 111. All practical different ball paths can thus be displayed and the recommemded ball path is made obvious to the player. The capability for the microcontroller to use full circles around pins to indicate the specific pin to hit, and to use half circles to indicate which side of a pin to hit, provides the bowler with the highest degree of guidance in aiming his ball.

Integrated Circuits used in the Advanced Bowling Tutor:

| | |
|---|---|
| 4-to-16 Line Decoder | 74HC4514 |
| Single-Chip CMOS Microcontroller | COP413C |
| Liquid Crystal Display Controller | COP472-3 |

Figure 15:
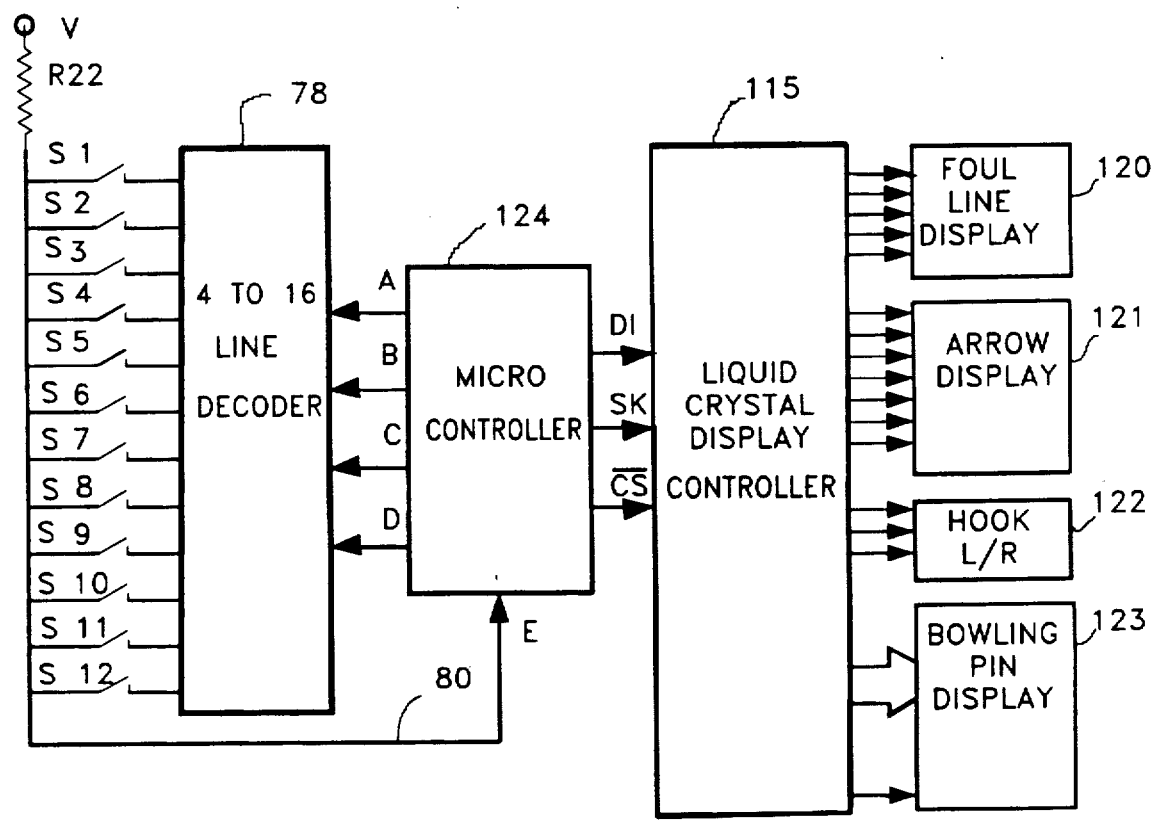
FIG. 15 is a circuit diagram of a second embodiment

FIG. 15, is a block diagram for the logic for the device shown in FIGS. 13 and 14 is similar to the arrangement of FIG. 11. However there are less connections required from the microcontroller 124, since the connection to the LCD display driver is by three wires D1, SK, and CS, which provide a serial coupling. All switch inputs to the microcontroller 124, shown in FIG. 15 are through the four (4) to sixteen (16) line decoder 114 which is the same as the decoder 76 used with the curcuit in FIG. 11.

There are many available integrated circuit drivers for liquid crystal displays which can be used to drive the LCDs of the advanced version of the device in FIGS. 13, and 14. For the one or two LCD drivers chosen for this example, the output from the single chip microcontroller 124 is in a serial stream through line D1, with line SK providing the serial clock and with the CS line controlling the LCD drive chip selection. The liquid crystal display driver 115 is a standard single chip with multiplexed output drive that drives the LCD display elements directly. Data is loaded serially and held in internal latches, within the display driver chip, with an on-chip oscillator that generates all the multi-level waveforms for back planes and segment outputs on a triplexed display. The connections are made directly from the liquid crystal display driver 115, connection to the foul line display 120, the arrow display 121, the hook and left/right indicator display 122, and the target pin display 123 by well known connection means, using zebra connectors to make contacts between the printed circuit board and the glass containing the liquid crystal segments.

Each segment that can be displayed on the liquid crystal has an assigned position in the one long word that is serially transmitted through line D1 and loaded into the display driver 116 from the microprocessor 124. This means that the position of each bit in the word received by the LCD driver, has a specific segment that it controls. Each bit in the word thus forms a part of the unique combination of back plane and segment line it causes to be driven in phase and that results in a single segment being displayed. Thus the program instructions only need to select the position of bits in the word to be sent to the display driver. These positions in the word determine the pins on the liquid crystal driver 115 selected to connect to the different parts of the said displays 120, 121, 122, and 123, FIG. 15.

The software program for sensing the closure of the input switches as shown in block 84 of FIG. 11 is also the same or very similar to the means in the advanced device for the storage of pin numbers pressed. The means for control of the left or right hand function 87 is also the same in both devices. The evaluation of the standing pin configurations is also much the same even for this much expanded truth table, FIG. 16. Changes in the truth table include specifying four (4) different degrees of hook, three degrees of which are calculated in use, and deletion of the left hand ball path points which are calculated from the points on the right hand ball path.

The column headed "Target" in FIG. 16 and other tables indicates the position of a pin with that number. For simplicity, target pin refers to this position whether a pin is standing there or not.

Since the microcontroller 124 FIG. 15 has a very limited read only memory capacity the control program and truth table must be designed for minimum size, without compromising capability of the Bowling Tutor. This has been done by eliminating redundancy, and calculating points that can be determined from a much reduced truth table, and storing in memory only one degree of hook, for only the right ball path, and calculating the others.

There are four (4) degrees of hook in the FIG. 16, truth table for the advanced bowler. Where the foul line is constant, and the maximum hook is specified, each decreasing degree of hook is found to add two boards to the arrow point. Thus, with the maximum hook specified in the stored part of the truth table, by addition, the program FIGS. 18A and 18B can quickly calculate the arrow point of the ball path.

For a few standing pin configurations, the foul line point on the ball path is not constant for different degrees of hook. Therefore, before the arrow calculation the program first tests the foul line point for the exceptions, and when found proceeds through a short subroutine to adjust for the foul line point.

Since the left handed bowler relates the trajectory of his ball to the left gutter of the alley, the points where he releases the ball and where it rolls over the arrows will be the same distance from the left edge of the alley as the right hand bowler's ball should be from the right edge. Since there are forty (40) boards on a bowling alley, the correct boards at the foul line and at the arrows can be obtained by subtraction of the numbers for the right hand truth table from forty (40), and the target, between pins or a single pin, usually remains the same.

FIG. 17 is a listing of only the MAXI hook part of the right hand advanced truth table, which has only 13 different ball paths. An added column headed "path listing" at the right hand side of the page names each unique ball path with a number or letter. Each of these named paths is stored in ROM and is the basic information used to calculate all ball paths. Since there are four different degrees of hook and two choices of handedness, and two choices of starting position at the foul line, there are a total of 208 different ball paths in the full truth table or are implied by the need for outputs for both left and right handed players. All of these are calculated from the 13 different stored listings. For the flat ball there is a foul line point, and an arrow point for the strike ball path that is inconsistent with the other ball path points. This is indicated in the truth table by a slash mark (/) between two numbers in the foul line and arrow columns. The first number, before the slash mark is for the flat hook, and the second number is for all other hooks. This condition only arises when the number one pin is standing, so the program, FIG. 18B has a separate short routine to provided for this combination, when the number one pin is standing and a flat degree of hook is specified.

Figure 18A:
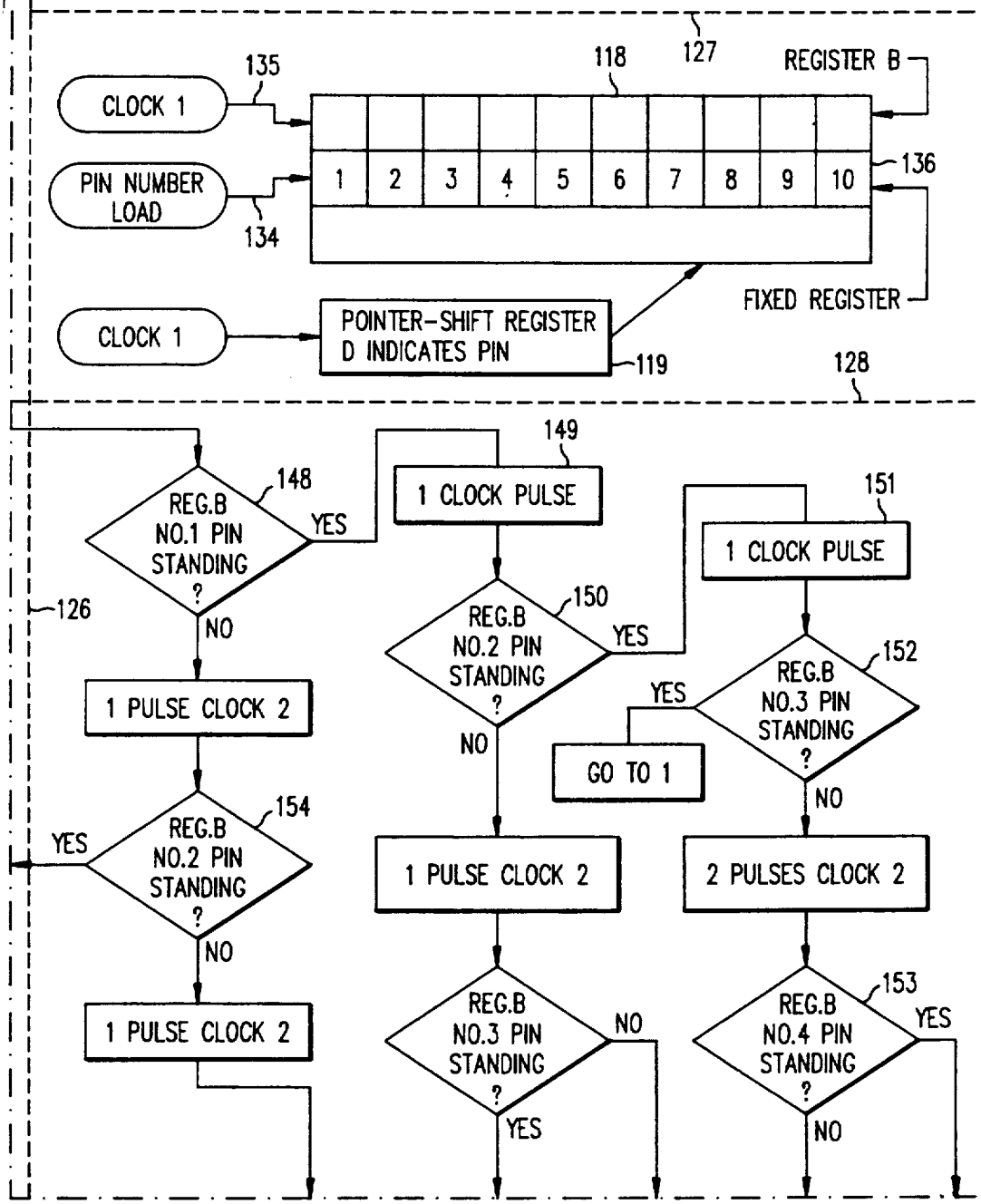
FIG. 18A and FIG. 18B are parts of the flow diagram, using steps to simplify the search for any combinations of pins remaining standing.
Figure 18A:
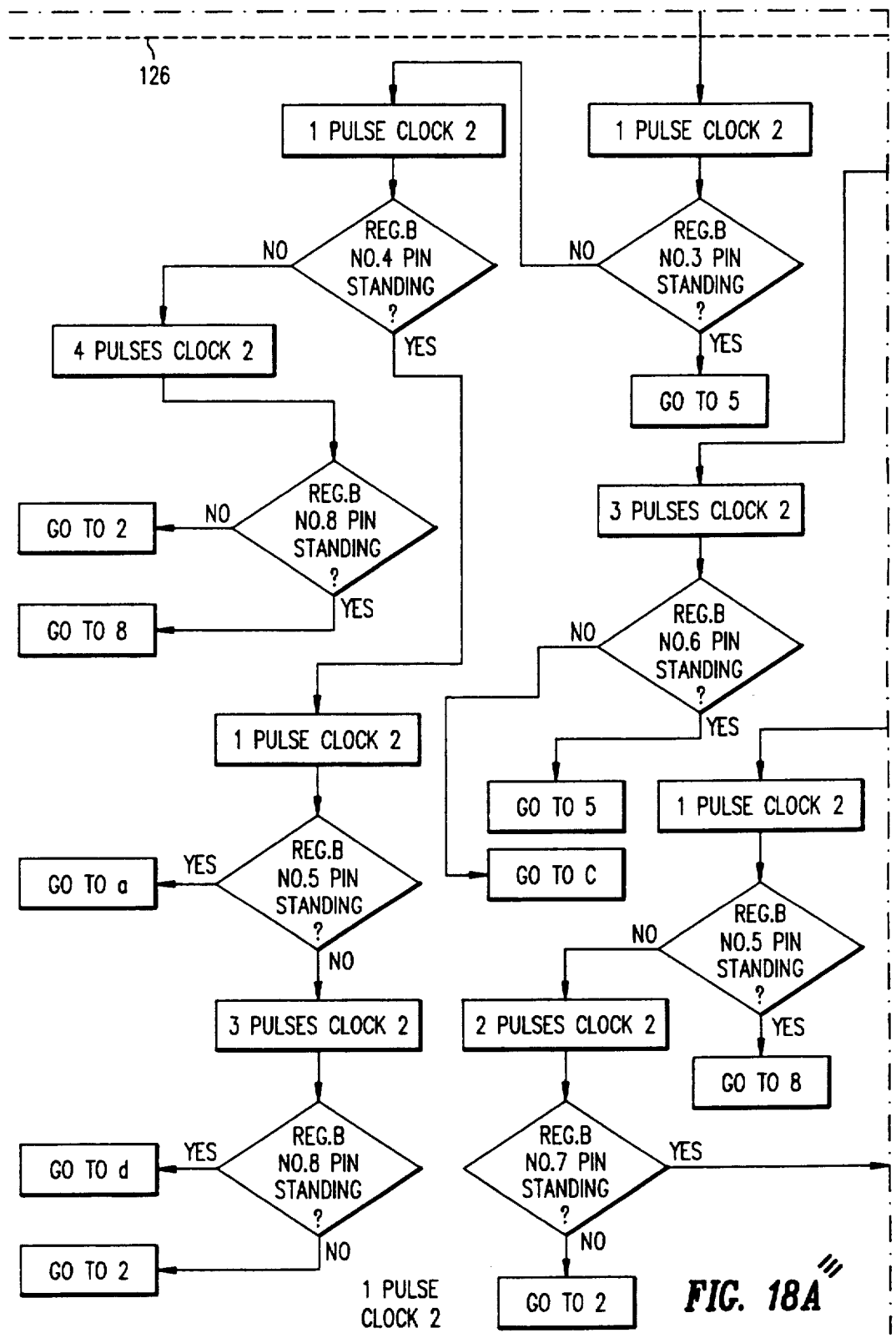
Figure 18A:
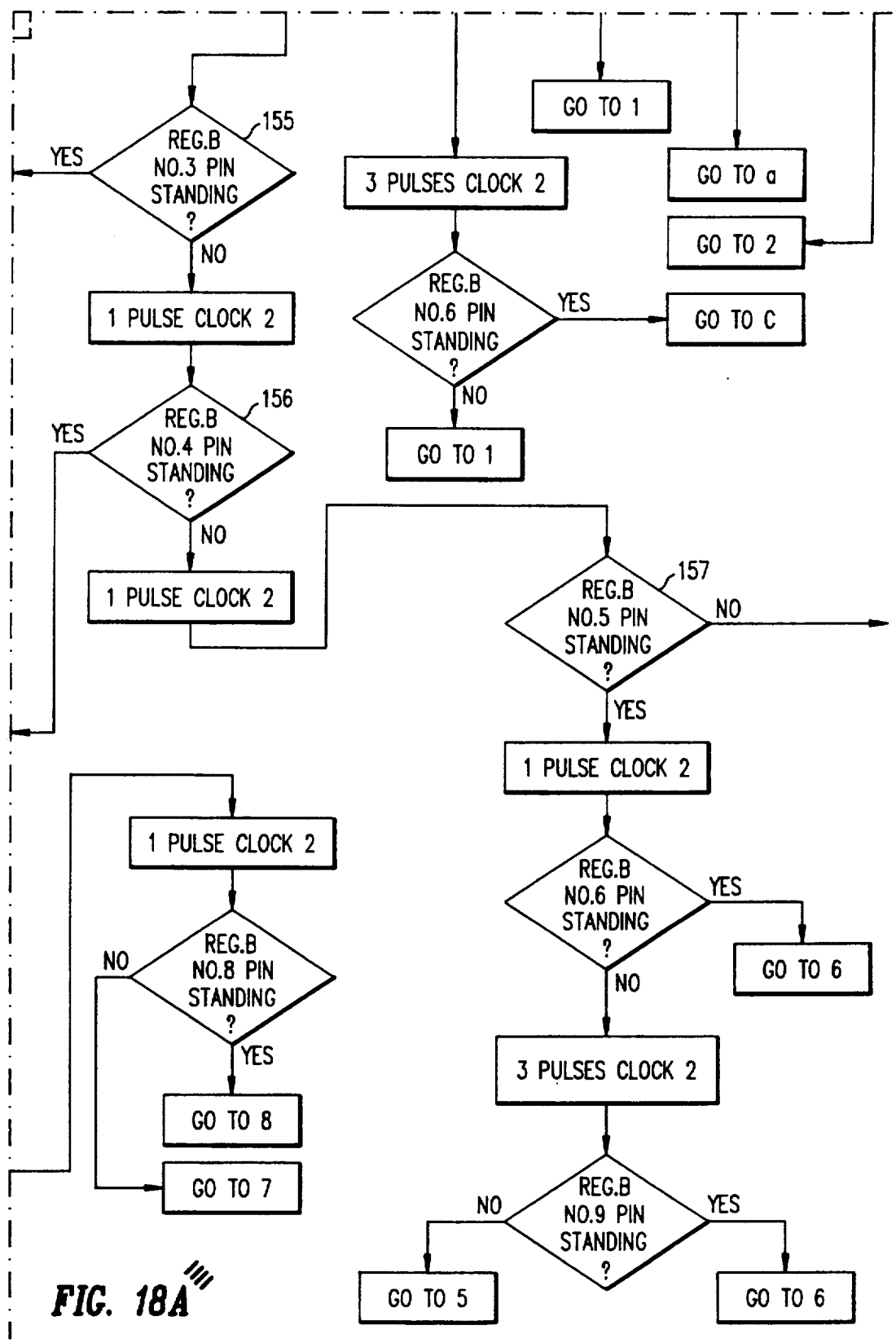
Figure 18B:
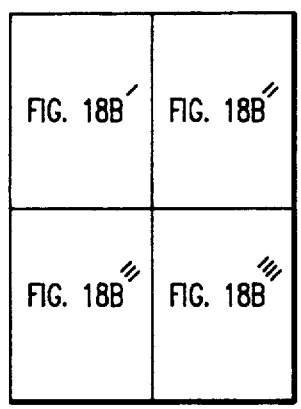
Figure 18B:
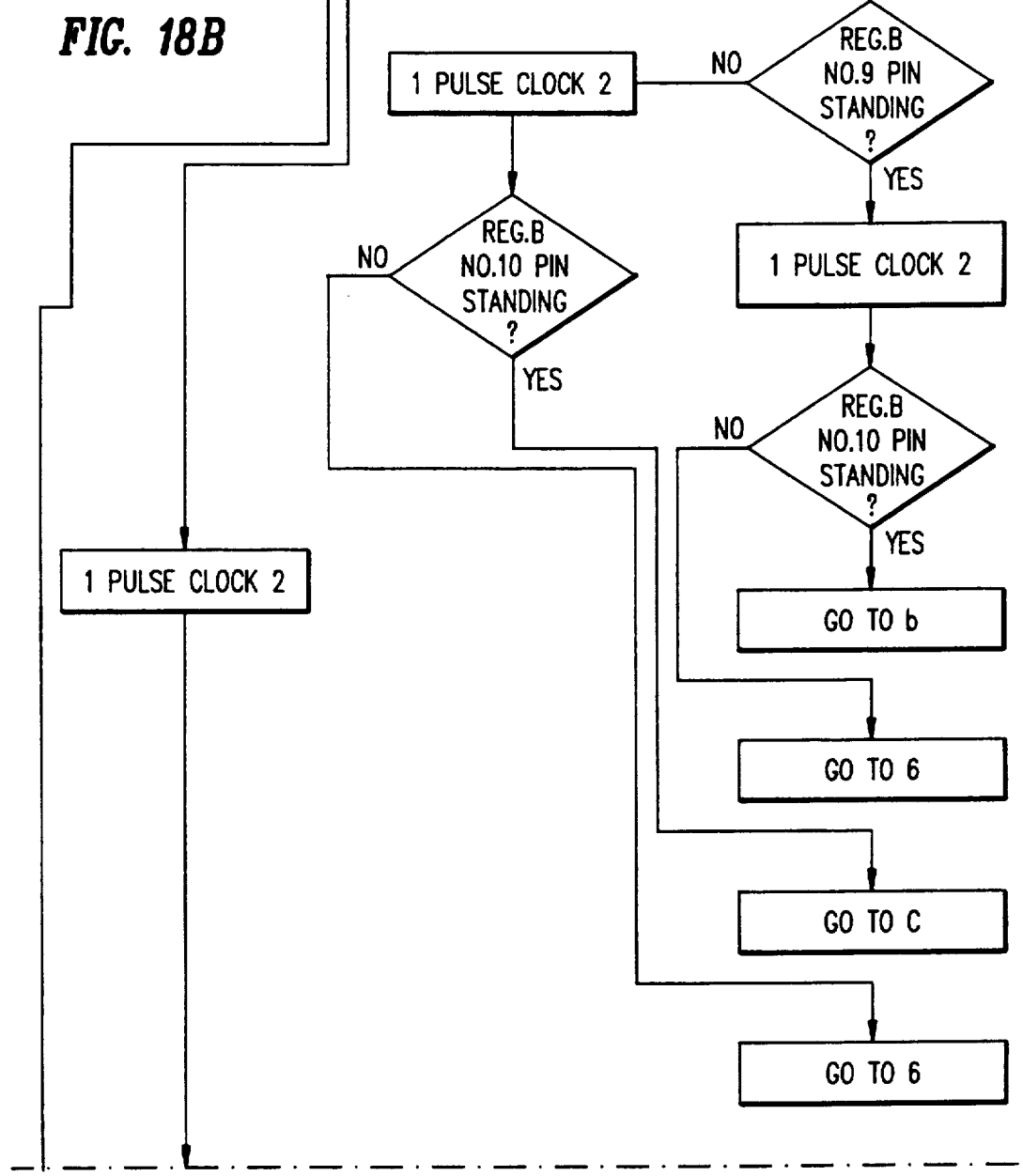
Figure 18B:
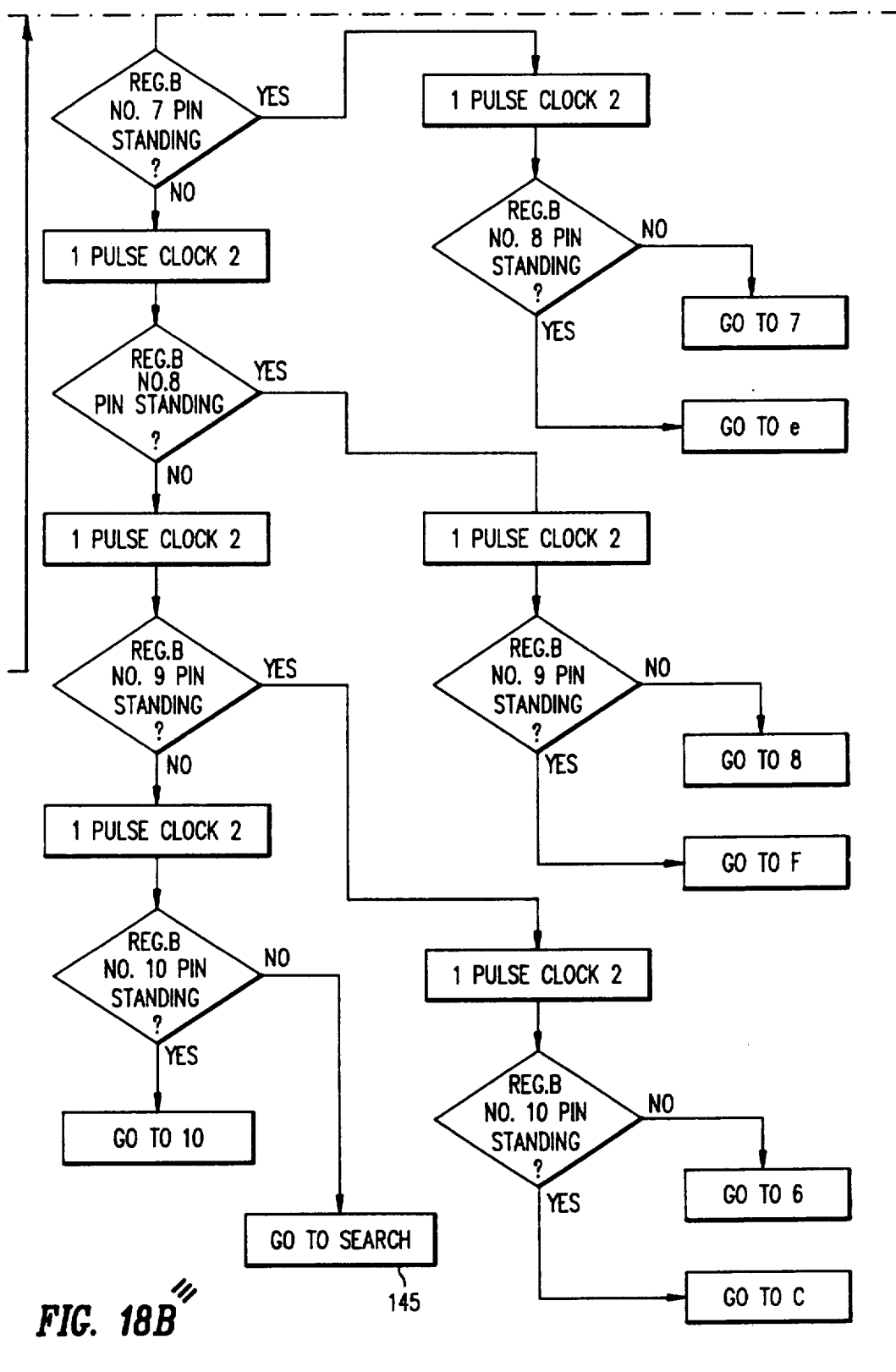
Figure 18B:
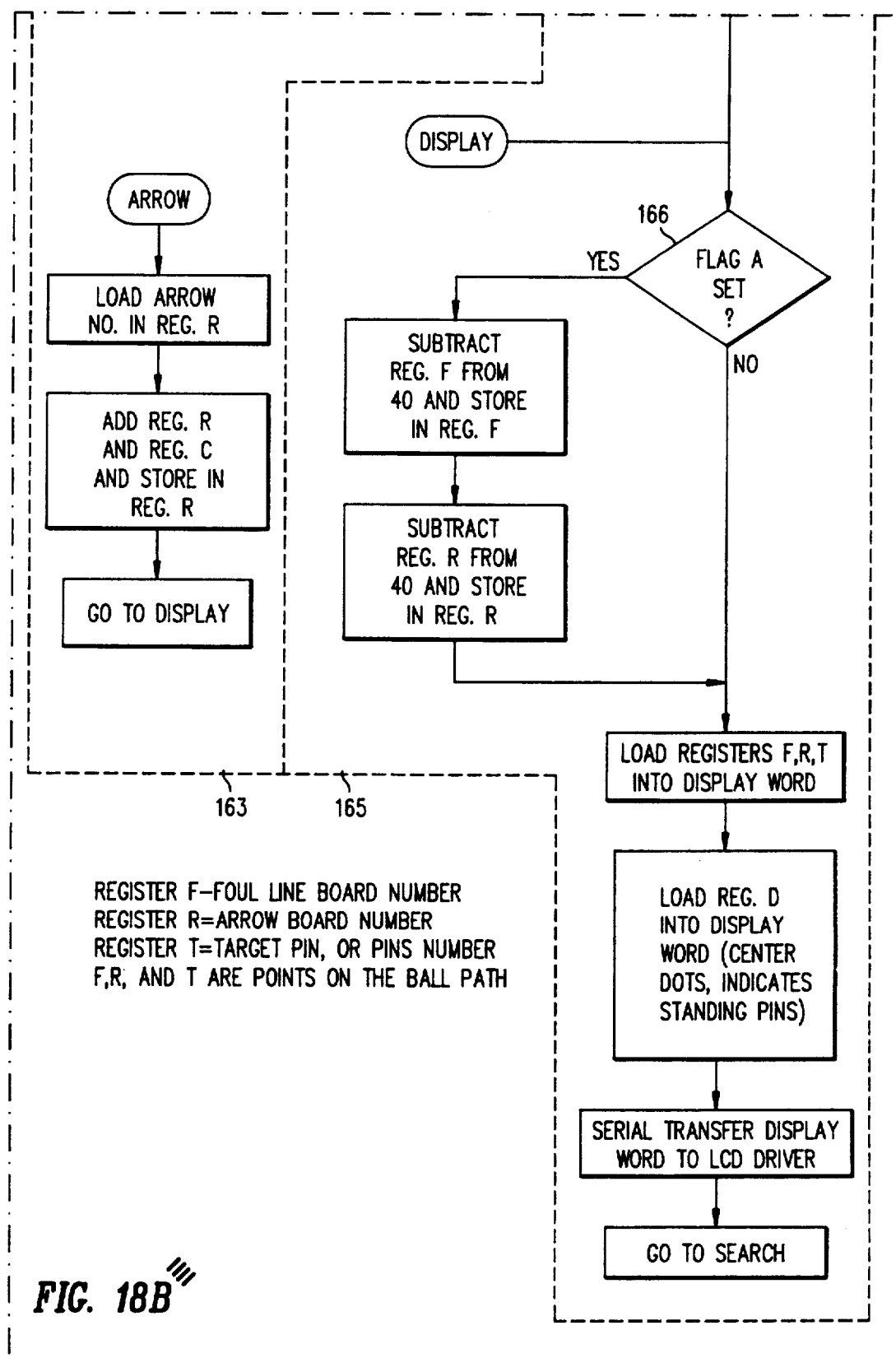

FIGS. 18A and 18B show the program flow for the control of the advanced device to select the ball path. When power is first turned on the program begins at the start block 116 included in the area enclosed in dotted lines 125. Flag C is set as the program passes through block 139. Since none of the input switches, S1 through S12 should be closed as power is turned on, the program will arrive at the GOTO SEARCH block 145, and be returned to SEARCH block 117 after passing through decision block 142 FLAG C SET?, will thus be directed by block 143, GOTO STRIKE, to the subroutine that will display the ball path for a strike. At the end of the STRIKE path listing the program always returns to START 116 and repeats the cycle just described until the program when passing through decision block 129, LINE E LOW, detects at least one switch S1 through S12 closed and directs the program through command 118, RESET FLAG C. With flag C reset the program will store switch numbers when any input switch from one to ten is closed, and in-between switch closings will select and show the best ball path for the pins already reported still standing. When either switch S11 or S12, or both are closed the program will pass through the the area 126, FIG. 18A enclosed by dotted lines, and arrive at RET 146 or 147 and will be sent back to START 116, after passing through block 139, flag C will be set, and and registers B and C will be cleared for a new frame. Finding no pin numbers in Register B it will return through the block labeled SEARCH 117, and through decision block 142 and block 143 to the Go To STRIKE instruction 144 again.

Register A inside of the microcontroller 124, is increased by one bit by block 140 FIG. 18A, on each pass so the binary output lines A, B, C, and D of the microcontroller 124, FIG. 15, count up and input a four bit digital number into the 4 to 16 line decoder 114 and if any switch S1 through S12 representing the equivalent ten based number has been depressed, the line decoder 114 will cause line E to be pulled low when the equivalent binary number is input by the microcontroller 124. Decision block 129 FIG. 18A, will pass the signal to functions 126 enclosed in dotted lines. If the switch number is S11, decision block 130 will pass the signal to block 137, which will add one bit to the register A, and thus in FIG. 15 increase the value of the output of lines A, B, C, and D, from the microprocessor 124 to the line decoder 114 to 12, and if the switch S12 is closed, result in a low on line E again. Thus, in FIG. 18A, if S12 is closed, decision block 132 passes the signal on to decision block 133, which will toggle the left/right flag to the alternate setting, changing the device to the alternate handedness, and thus changing the ball path. If the switch S12 is not closed, decision block 132 will cause the program to pass to GOTO STRIKE block 144 from which it will jump to the path listing to reset the display to show the strike ball path for a new frame. In the alternate case where switch S11 is not being pressed, but switch S12 is closed, decision block 130 passes the program to decision block 131, which passes the program on to block 138 which instructs the program to add two bits to register C.

Register C counts up to b and returns to zero. It is used to provide the number to be added to the MAXI arrow board number from ROM to obtain the degree of hook. As long as switch 12 alone is depressed the degree of hook will continue to change every one half second, through its four alternates with the rate controlled by the delay in block 139. Register C also drives the part of the display FIG. 12, that shows the degree of hook chosen.

When neither switch 11 or 12 are closed, but one of the other switches S1 through S10 representing standing pins are closed, decision blocks 129, 130, and 131 pass the program on to block 134, which causes the program to jump to the store standing pins subroutine shown in the area 127 enclosed by dotted lines. Register B 118, is equivalent to a shift register, but is stationary, while the program shifts the pointer 119 one position to the right with each clock pulse. A binary one bit in any box of register B has a value in base ten numbers equal to the number in the fixed register 136 just below it, and a zero in any box of Register B indicates the lack of a bowling pin with that equivalent number reported standing. The pointer 119 is kept in step with Register A, so that there is an automatic conversion from binary numbers to base ten and from base ten to binary, with only one bit stored to indicate the number of any standing bowling pin.

When the program returns to the START block 116, and passes down to decision block 129, LINE E LOW? and finds no input switches closed it begins a search for standing pins in Register B, to determine the best ball path by starting at the lowest pin number in said register B, and continuing to test the effect of each pin after the lowest numbered pin found on the selection of the ball path. Never is it required to search past the third pin in increasing numerical order. The following chart indicates in the second column the ball path listing that will be chosen for the first and lowest pin number found in the first column. The combinations of additional higher numbered pins with resulting different choice of path listing are then listed to the right of each primary path listing:

| Lowest pin number | 1st Path listing | SEQUENCE OF BALL PATH SELECTION Path listing selected on 2nd or third higher bowling pin number | | | |
|---|---|---|---|---|---|
| 1 | 1 | 1-2 = a, | 1-2-4 = 2, | 1-3-6 = c | |
| 2 | 2 | 2-3 = 5 | 2-4-5 = a, | 2-4-8 = d, | 2-8 = 9 |
| 3 | 5 | 3-6 = c | | | |
| 4 | 2 | 4-5 = 8 | 4-7 = 7 | 4-7-8 = e | |
| 5 | 5 | 5-6 = 6 | 5-9 = 9 | | |
| 6 | 6 | 6-9-10 = 6 | | 6-10 = 6 | |
| 7 | 7 | 7-8 = e | | | |
| 8 | 8 | 8-9 = f | | | |
| 9 | 6 | 9-10 = c | | | |
| 10 | 10 | — | | | |

In FIG. 18A the area enclosed in dotted lines numbered 128 analyzes the bowling pin numbers found in Register B, and selects a ball path listing. Decision block 148 tests for the storage in Register B of pin number one, and if present, passes the program to block 149 which provides a pulse to advance to the second box of register B, where decision block 150 determines if the number two pin has been reported standing. If the number two pin is standing decision block 152 will test for the number three pin standing and if it is, send the program to ball path listing 1, but if the number three pin is not reported to be standing, the program will continue to decision block 153, which will determine if the number 4 pin is standing, and if it is, will send the program to ball path 2 listing, otherwise it will go to path listing a. The part of the flow diagram just described determines first if the number one bowling pin is standing, and if it is then tests for the special cases. A special case not listed in the Sequence of Ball path Selection chart above, under alternate path listing selected, is NUMBER 3 PIN STANDING? in decision block 152. There is quite a long list of pin standing configurations that start with 1-2-3, all of which call for the ball path listing 1, and all can be included by the one test in said decision block 152.

The search for pins reported standing starts with decision block 148 which tests for the presence of pin number one as stated previously. If pin one is not found in Register B, the program proceeds to decision block 154, which tests for pin number two and if it is not found proceeds to decision block 155 which tests for pin number three, and if this pin is not found proceeds to decision block 156, that tests for pin number four, and if not found continues to decision block 157 which tests if the number five pin was reported standing. Thus the program continues up the rank ordered record of standing pins in Register B, and if it finds none it arrives at block 145, that instructs it to return to SEARCH 117 where it starts over again.

After the lowest numbered pin in Register B is found the program next tests in the following decision blocks for any higher numbered pins that would change the selection of the ball path listing. If one or two such pins are found the alternate ball path listing is called.

The 13 alternate ball path listing subroutines enclosed in dotted line areas 158, and 159 in FIG. 18B are the starting point for designating the bowling ball path points at the foul line and the arrow and the target pins for any pin or pin configuration reported standing. Of the 12 path listing subroutines starting in area 158, only four are shown, because all the rest are connected in parallel to the same first command box 161 which recalls the named path listing from memory in the area 172 enclosed in dotted lines. The foul line number and the target pin, or pins are then placed in separate single digit registers. The program then jumps to area 163 where the arrow board number is taken from the ball path listing and placed in separate single digit register R, and then the number in Reg. C, indicating the degree of hook is added to it. The program then passes into area 165, also enclosed in dotted lines, where decision block 166 shunts the program into a procedure to subtract the foul line and arrow board numbers from 40 only if a left hand path is required. The program then loads foul line, arrow and pin target numbers into the display word and sends it to the LCD driver for display, and the program returns to the SEARCH to start over again.

The two ball path subroutines in area 159 are the same but are shown separately for clarity. Within area 164 block 160 recalls the listing for STRIKE and decision block 162 determines if a FLAT hook is called for, and if it is the special numbers for that ball path are supplied. Otherwise the decision block 162 passes the program to area 168, that returns it to area 172 for the same processing as for all other ball path subroutines.

The instructions used in the flow diagram FIG. 18A, and 18B are all simple and consistent with the few rudimentary commands available in a small eight bit microcontroller, such as clear, add, set, reset, and decisions such as equal zero?, etc.

Figure 19:
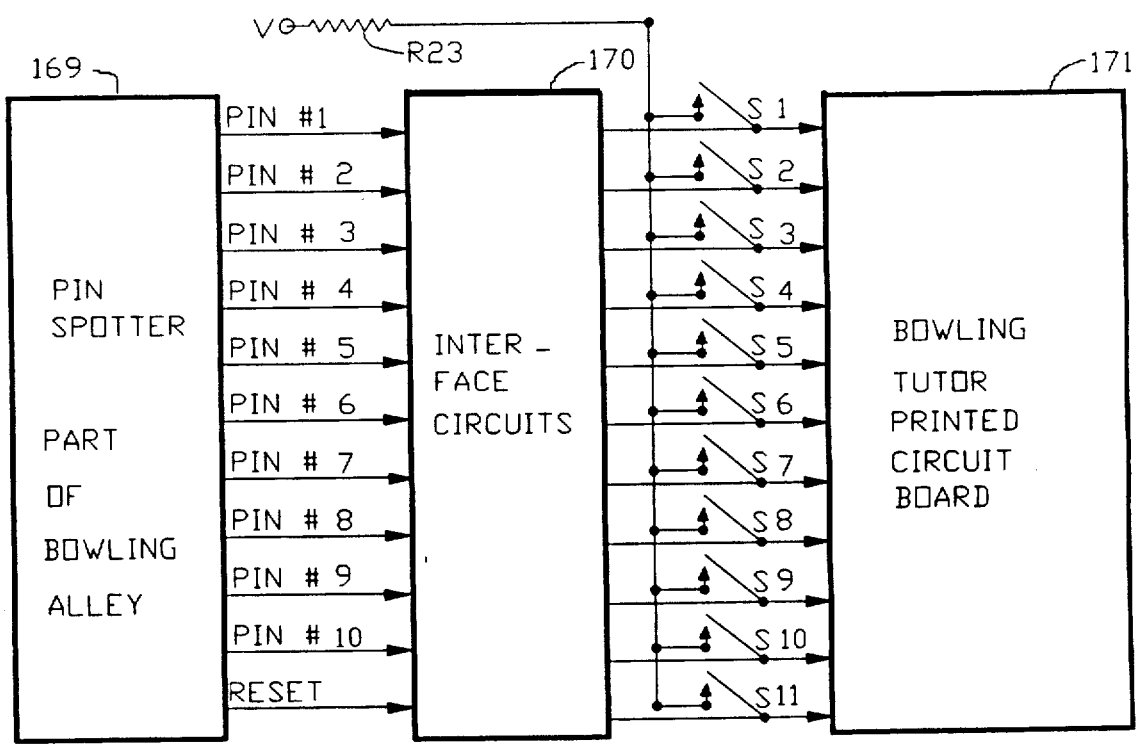
FIG. 19 illustrates an interface for direct input of the standing pin data from the pin spotter output.

The device as described herein is self-contained and requires no connections to any equipment of a bowling alley. However, the system that has been described herein can readily be connected to the pin spotter switches of a bowling alley so that the configuration of standing pins can be automatically loaded into the device. The interface shown in FIG. 19 requires only 11 parallel lines from the standing pin output of the pin spotter 169. Interface 170 can be optoisolators to protect the circuits of the device on the printed circuit board 171 or a voltage converter integrated circuit to insure a compatible three (3) volt input to the said device 171. With the membrane input switches S1 through S11 in parallel with the pin spotter input, the bowler has the option of over riding the automatic inputs and making corrections. The bowler also has complete control of the degree of hook and the right or left handed operation, as before.

We claim:

1. A hand held portable instructional device for displaying to the user an indication of the ideal path that a bowling ball should follow on a standard bowling alley for a plurality of different standing bowling pin configurations and the user's selected degree of hook, said path beginning at the foul line and ending at one of a plurality of predetermined pin targets, and including reference to at least one standard foul line marker and at least one standard arrow marker, said device comprising in combination,
   A) a multi-layered membrane switch having a top layer comprising a static display member illustrating in a scaled plan view, said standard bowling alley showing standard locations of ten bowling pins, standard foul line markers, and standard arrow markers,
   B) input means for entering the user's selected degree of hook into said device,
   C) means to visually indicate on said display member an ideal path for a bowling ball to follow for one of said plurality of standing pin configurations, including selectively energizable indicators positioned adjacent said markers and said pin targets,
   D) input means, comprising said membrane switch and said display member for entering into said device, positional data defining said one standing pin configuration, and
   E) electronic digital control means, connected between said input means and said means to visually indicate by simultaneously energizing in response to said positional data, a first selected said indicator disposed adjacent one of said foul line markers, a second selected said indicator disposed adjacent one of said pin targets whereby said ideal path for said one standing pin configuration is indicated to said user.

2. The device set forth in claim 1 in which said multi-layered membrane switch further includes a bottom layer and an insulating layer disposed between said top and bottom layers, said top and bottom layers each having a plurality of conductors disposed on one surface of said layer adjacent said insulating layer, said insulating layer having a plurality of openings, each of which is in registry with a different said pin location to permit one of said conductors on said top layer to contact one of said conductors on said bottom layer when one of said pin locations is pressed by said user.

3. The device set forth in claim 2 in which said ideal path is indicated is for either a right hand bowler or a left hand bowler and said device further includes a two position switch means connected to said control means to select said ideal path for said right hand bowler or said ideal path for said left hand bowler.

4. The device set forth in claim 3 further including a multi-position switch means connected to said control means to energize a different combination of said markers whereby a modified ideal path is indicated that more closely resembles the actual path that a bowling ball thrown by said user normally follows.

5. The device set forth in claim 4 in which said control means includes storage means for storing data entered into said device through said membrane switch defining said standing pin configuration, and digital logic circuitry for converting data stored in said storage means to drive signals for energizing predetermined said indicators.

6. The device set forth in claim 5 in which said indicators comprise light emitting diodes, each of which is connected to said control means, and said top layer of said membrane switch above each said diode is transparent to permit light from each said indicator when energized to be seen.

7. The device set forth in claim 1 in which said indicators comprise separate patterns in pre-defined areas on a liquid crystal display having input terminals connected to said control means, and said top layer of said membrane switch above each said pattern is transparent to permit said indicator when energized to be seen.

8. The device set forth in claim 7 in which said patterns associated with said pin target indicators comprise full circles and half circles disposed concentrically relative to said pin locations on said display member.

9. The device set forth in claim 8 in which said control means includes a memory having a plurality of storage locations, each of which has an address which is associated with one said pin configuration and each of which stores binary data defining a different combination of said indicators that are energized to indicate said ideal path for said one said standing pin configuration associated with said address of said each storage location.

10. The device set forth in claim 9 further including feedback to visually confirm to said user said positional data which is entered into said device.

11. The device set forth in claim 10 in which said feedback means further includes means to energize said liquid crystal display to selectively illuminate the center of each said pin location which corresponds to said positional data entered into said device.

12. A method for displaying to the user of a standard bowling alley an indication of the ideal path that a bowling ball should follow on said alley for a plurality of different standing bowling pin configurations and the user's selected degree of hook, said path beginning at a foul line and ending at one of a plurality of predetermined pin targets, and including reference to at least one standard foul line marker and at least one standard arrow marker, said method comprising the following steps in combination, A) providing a multi-layered membrane switch having a top layer static display member illustrating a scaled plan view of said alley showing standard locations of ten bowling pins, standard foul lines markers, and standard arrow markers, B) establishing a plurality of selectively energizable indicators on said display member, with one said indicator adjacent each of said markers and said pin targets, C) energizing at least three different said indicators, the first of which is adjacent one of said foul line markers, the second of which is adjacent one of said arrow markers, the third of which is adjacent one of said pin targets, including the steps of,
  1) generating with said membrane switch first input data representing at least one of a plurality of different standing pin configurations,
  2) generating second input data representing the user's selected degree of hook,
  3) storing said input data, and
  4) developing an input signal from said stored input data to energize a set of first, second and third indicators pre-selected in accordance with said one standing pin configuration to cause said ideal path to be displayed.

13. The method recited in claim 12 in which said step of generating input data further includes the step of generating other input data that modifies said output signal to reflect an actual path that a specified bowling ball is following on a specified alley when thrown by a predetermined bowler.

14. The method recited in claim 13 including the further steps of storing information defining one ideal curve for each of a plurality of said pin configurations, and mathematically modifying said information defining said ideal curve to provide said output signal which reflects said.

15. The device set forth in claim 1 further including a parallel input means to said input means adapted to receive input data from pin spotter grabber switches of a bowling alley.

* * * * *